United States Patent
Chazin et al.

(10) Patent No.: US 9,197,427 B2
(45) Date of Patent: Nov. 24, 2015

(54) METHODS AND SYSTEMS FOR SCREENSHARING

(75) Inventors: Steve Chazin, Hollis, NH (US); Prakash Khot, Acton, MA (US)

(73) Assignee: salesforce.com, inc., San Francisco, CA (US)

(*) Notice: Subject to any disclaimer, the term of this patent is extended or adjusted under 35 U.S.C. 154(b) by 314 days.

(21) Appl. No.: 13/489,304

(22) Filed: Jun. 5, 2012

(65) Prior Publication Data

US 2013/0055113 A1     Feb. 28, 2013

Related U.S. Application Data

(60) Provisional application No. 61/528,035, filed on Aug. 26, 2011.

(51) Int. Cl.
    *G06F 15/16*     (2006.01)
    *H04L 12/18*     (2006.01)
    *G06F 3/00*     (2006.01)

(52) U.S. Cl.
    CPC .............. *H04L 12/1822* (2013.01); *G06F 3/00* (2013.01); *G06F 15/16* (2013.01); *H04L 12/1827* (2013.01)

(58) Field of Classification Search
    CPC ....... G06F 15/16; G06F 3/00; H04L 12/1822; H04L 12/1827
    USPC ........................... 715/751, 753, 758; 709/204
    See application file for complete search history.

(56) References Cited

U.S. PATENT DOCUMENTS

| | | | |
|---|---|---|---|
| 8,458,597 B1 * | 6/2013 | Tijssen | 715/748 |
| 2006/0002315 A1 | 1/2006 | Theurer et al. | |
| 2006/0031779 A1 * | 2/2006 | Theurer et al. | 715/781 |
| 2006/0053194 A1 | 3/2006 | Schneider et al. | |
| 2006/0236247 A1 | 10/2006 | Morita et al. | |
| 2007/0256019 A1 * | 11/2007 | Hirsave et al. | 715/741 |
| 2008/0034038 A1 * | 2/2008 | Ciudad et al. | 709/204 |
| 2008/0126949 A1 * | 5/2008 | Sharma | 715/751 |
| 2009/0183087 A1 * | 7/2009 | Robins | 715/751 |
| 2009/0214014 A1 * | 8/2009 | Cadiz et al. | 379/142.15 |
| 2010/0205100 A1 * | 8/2010 | Hurley et al. | 705/80 |
| 2011/0252366 A1 * | 10/2011 | Balasubramanian et al. | 715/809 |
| 2012/0203854 A1 * | 8/2012 | Chan et al. | 709/206 |
| 2013/0254317 A1 * | 9/2013 | Altberg et al. | 709/206 |

OTHER PUBLICATIONS

International Searching Authority, International Application No. PCT/US2012/051589, Transmittal of International Search Report and the Written Opinion, Nov. 28, 2012, pp. 1-10.

* cited by examiner

*Primary Examiner* — Anil Bhargava
(74) *Attorney, Agent, or Firm* — Dergosits & Noah LLP; Todd A. Noah

(57) ABSTRACT

A user engaged in an online chat session with one or more other users can start a screen sharing session with the other users without having to leave the context of the online chat session. In an implementation, a chat window for the chat session includes a screen sharing button. The screen sharing button can be clicked to start a screen sharing session with the other chat participants. A system generated message is displayed within the chat windows of the other chat participants inviting them to view the remote screen. Upon accepting the invite, a viewer is launched to show the information being displayed on the remote screen.

14 Claims, 20 Drawing Sheets

FIG. 6B

METHODS AND SYSTEMS FOR SCREENSHARING

CLAIM OF PRIORITY

This application claims the benefit of U.S. Provisional Patent Application 61/528,035, entitled METHODS AND SYSTEMS FOR SCREENSHARING, by Steve Chazin and Prakash Khot, filed Aug. 26, 2011, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to computer systems and software, and, more particularly, to screen sharing.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

For organizations operating in today's economy, dominating the increasingly dynamic business landscape has never been more difficult. A dispersed and mobile workforce is making it difficult for companies to conduct face-to-face meetings and even video/conference calls where insights are traditionally discovered, shared, discussed, and applied to improve business. Modern businesses can not afford to wait for the next quarterly all-hands meeting to spot a new competitor, product, issue, market opportunity, or customer attrition trend. Instead, businesses need to be able to spot trends, patterns, and anomalies in real-time—and then collaborate across a geographically dispersed team to drive a business decision.

Traditional techniques to engage a geographically dispersed team are too rigid, time-consuming, and cumbersome to use. A combination of macro-market forces is creating a new set of challenges for business people within organizations of all sizes. These challenges are making it imperative to provide greater access to real-time data and insights—even as team members become increasingly dispersed across different offices in different parts of the world.

Therefore, there is a need for improved systems and techniques for a cloud-based, real-time collaboration platform that lets users instantly share valuable information without leaving the system they use everyday.

BRIEF SUMMARY

In an embodiment, a user engaged in an online chat session with one or more other users can start a screen sharing session with the other users without having to leave the context of the online chat session. In an implementation, a chat window for the chat session includes a screen sharing button. The screen sharing button can be clicked to start a screen sharing session with the other chat participants. A system generated message is displayed within the chat windows of the other chat participants inviting them to view the remote screen. Upon accepting the invite, a viewer is launched to show the information being displayed on the remote screen.

In an embodiment and by way of example, a method for screen sharing includes managing a browser-based chat session including first and second users, the first user being at a first display, and the second user being at a second display. Providing, in response to the first user selecting a screen sharing button, a message inviting the second user to view information being displayed on the first display, displaying the message in a chat window for the chat session on the second display, receiving an acceptance from the second user to view the information, and upon receiving the acceptance, sharing the information being displayed on the first display with the second user.

While one or more implementations and techniques are described with reference to an embodiment in which screen sharing is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Any of the above embodiments may be used alone or together with one another in any combination and with more than two people involved. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 6B illustrates a screen shot of a web page where a screen sharing viewer plug-in is being installed in the first embodiment;

DETAILED DESCRIPTION

Systems and methods are provided for screen sharing. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Figure 1:
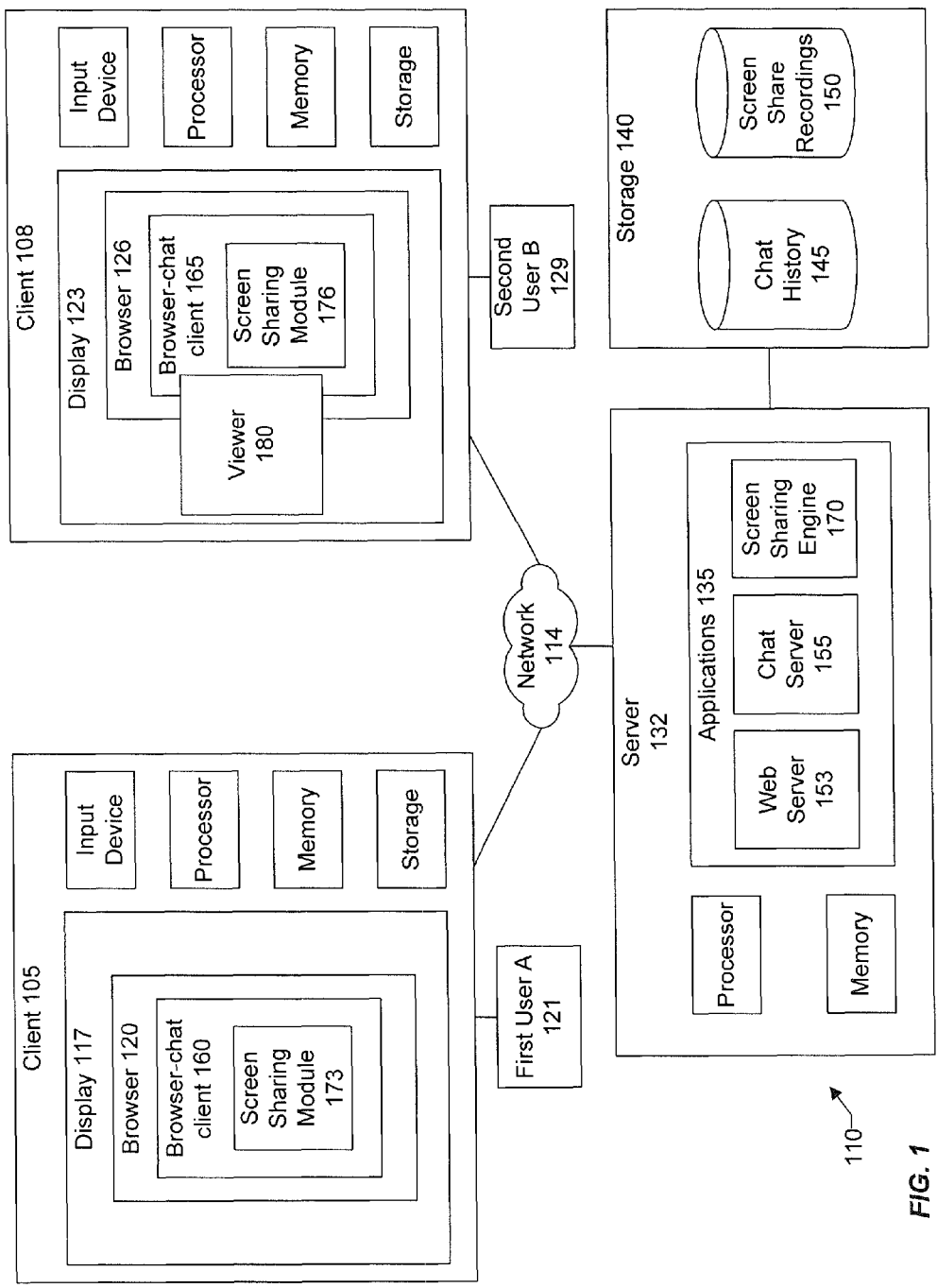
FIG. 1 illustrates a block diagram of a system for screen sharing in an embodiment.

FIG. 1 illustrates a representative system for collaboration and, more particularly, for screen sharing in an embodiment. In a specific implementation, the system facilitates screen sharing between two or more people engaged in an online chat conversation (e.g., instant message (IM), or online discussion). This system includes any number of clients such as first and second clients 105 and 108. The clients access a real-time collaboration platform 110 via a network 114. The network is as shown in FIGS. 8-9 and described below.

Figure 8:
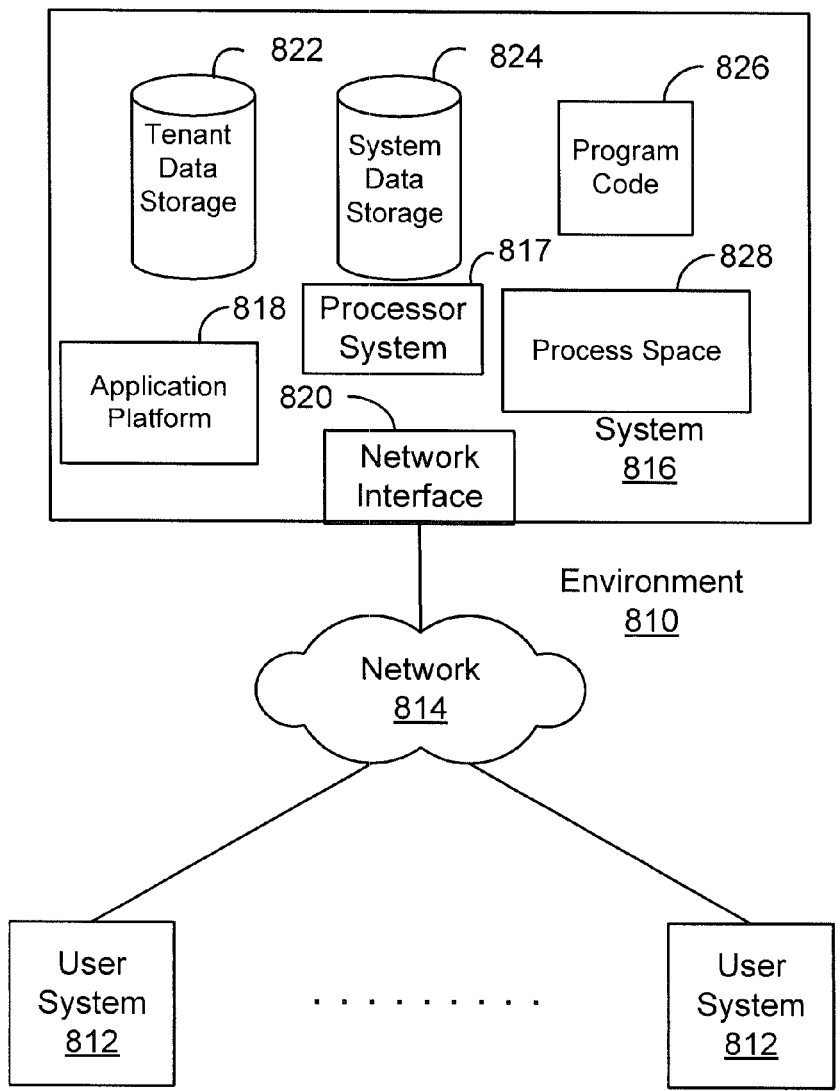
FIG. 8 illustrates a block diagram of an example of an environment wherein an on-demand database service implementing an embodiment of screen sharing might be used.
Figure 9:
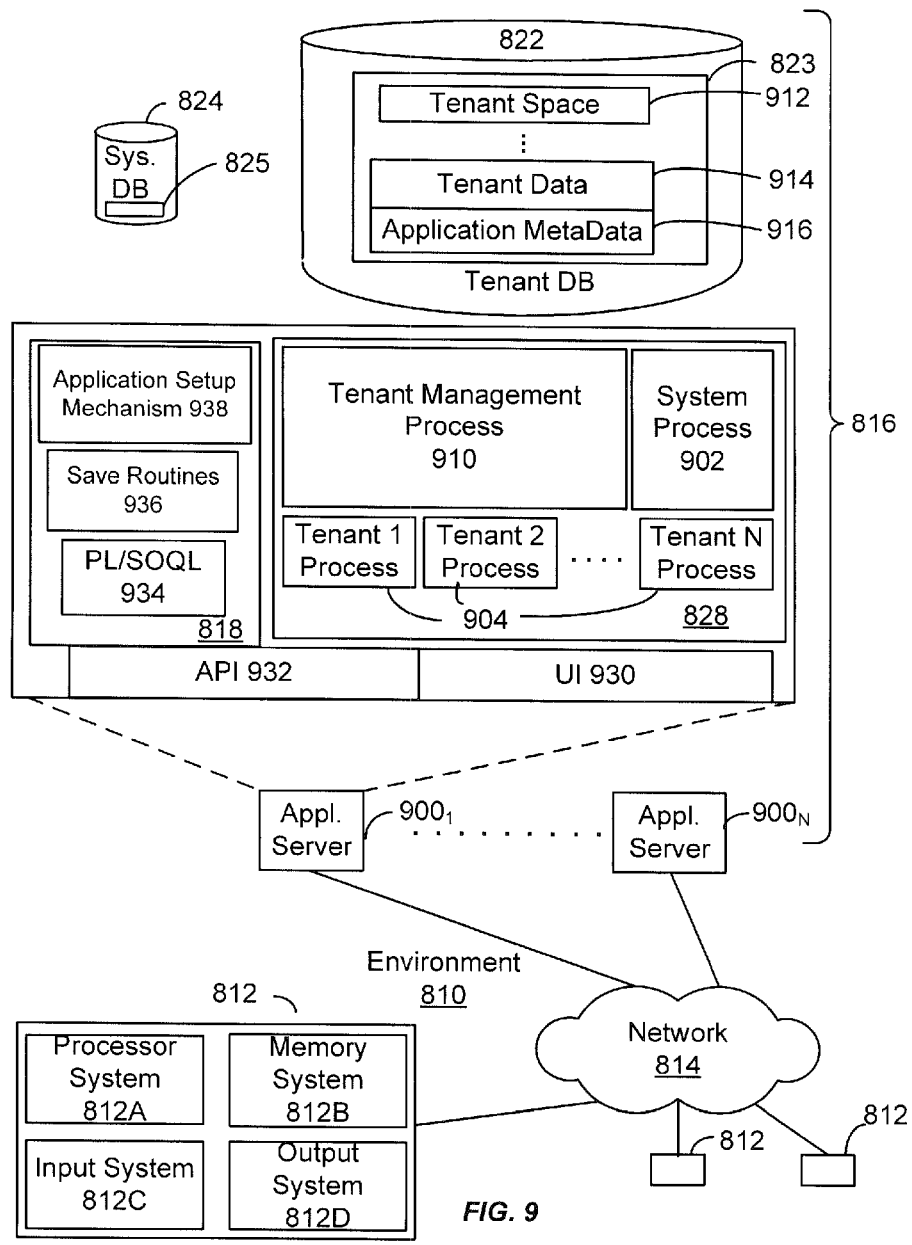
FIG. 9 illustrates a block diagram of an embodiment of elements of FIG. 8 and various possible interconnections between these elements.

The clients are general purpose computers that may include, for example, smartphones and tablets, with hardware and software, such as shown in FIGS. 8-9 and described below. For example, the first client includes a first display or electronic screen 117, a first browser application program 120, an input device, processor, memory, and storage. A first user A 121 can be at the first client and viewing first display 117.

Similarly, the second client includes a second display or electronic screen 123, a second browser application program 126, an input device, processor, memory, and storage. A second user B 129 can be at the second client, remote from the first client, and viewing second display 123. The clients execute executable code (or computer-readable code) that embodies a technique or algorithm as described in this application. The browser is an application program that can request, receive, and process data from a user, the server, or both. The data can be shown via the first and second displays.

In a specific implementation, the collaboration platform provides an enterprise social network for an organization, company, or other entity or group of entities. Through the collaboration platform, users can collaborate on projects such as sale pitches, presentations, documents, product development activities, marketing campaigns, research, and much more. Users can form ad hoc groups, share files, follow coworkers and data to receive broadcast updates, and much more. It should be appreciated that aspects of the system may be used to implement other types of web sites and applications having various and different purposes (e.g., e-learning, educational sites, virtual education, technical support, or customer support).

In particular, the collaboration platform includes a server 132 having components similar to the components shown in FIGS. 8-9 and described below. For example, the server includes a processor, memory, applications 135, and storage 140. A web server 153 delivers web pages and other data from the storage to the browsers. Some examples of web servers include Oracle iPlanet Web Server, Apache, Internet Information Services (IIS), nginx, Google Web Server (GWS), Resin, lighttpd, and others.

A chat server 155 is responsible for managing chats or a chat session between two or more users. A chat may be referred to as an instant message. A chat session is a form of communication over a network (e.g., Internet) that offers real-time or near real-time transmission (e.g., within 150 ms of latency) of text-based messages. A chat session may instead or additionally include live audio (e.g., voice), video calling or video chat, pictures, or images.

In a specific implementation, as shown in the example in FIG. 1, first and second browsers include first and second chat components or browser-based chat clients 160 and 165, respectively. In this specific implementation, the chat components are executed within the respective browsers. That is, the chat components include code in a browser-supported language (e.g., JavaScript, Java, HTML, DHTML, or Ajax). The chat components rely on a web browser for execution. If a user exits or closes their web browser then the chat session may be terminated. Because the chat is browser-based, the first and second clients can have different operating systems (OS) and the first and second users will still be able to participate in a chat session. For example, the first client may have a Windows OS and the second client may have a Mac OS (or iOS in the case of an iPad, and so forth). In another specific implementation, a chat component is installed as a client application on the client, separate from the browser application program.

The chat components provide graphical user interfaces (GUIs) that include chat windows for users A and B to input and view chat messages. In particular, the chat server can receive a chat message from user A and forward the chat message to user B. User B can reply to the chat message and the chat server can forward the reply to user A. These chat messages are displayed by the chat clients via the chat windows for the chat participants (e.g., users A and B) to view. The chat messages may be archived and stored in chat history 145.

A feature of the system includes a screen sharing engine 170, and a screen sharing module (e.g., modules 173 and 176). The screen sharing modules are integrated with chat components 160 and 165, respectively. In a specific implementation, the system allows users to participate in a browser-based chat session and, while participating in or within the context of the chat session, have a screen sharing session.

In this specific implementation, while a chat session is being conducted, first user A can select (e.g., click) a screen sharing option or control from within the browser window. In a specific implementation, the screen sharing option is displayed within or inside the chat window. The system automatically generates or provides a message inviting, notifying, prompting, or asking the other chat participants (e.g., second user B) to view the information being shown on first user A's display. The message is displayed in the chat window of the other chat participants such as second user B. When second user B accepts the invitation, a viewer plug-in 180 is launched or invoked at the second client for second user B. The viewer shows in real-time or near real-time the information being displayed on the remote display (e.g., first user A's display) for second user B to view. In another specific implementation, a web browser includes a built-in viewer, i.e., the viewer is not a plug-in, and/or may be using code already built into the platform (HTML5 or H.264 video playback).

In a specific implementation, the screen sharing session may be archived, e.g., recorded and stored in screen sharing recordings 150 for playback at a later date. For example, there can be an archived threaded discussion or transcript which may include some screen sharing sessions. In this specific implementation, the transcript includes the system generated message for the screen sharing session. The system generated message appears on the transcript within the context of the messages from the other chat participants. This allows for an accurate accounting or recording of events that occurred during the chat session.

There can be any number of users participating in the chat session. For example, there can be two, three, four, five, six, seven, eight, nine, ten, or more than ten users participating in the chat session. In a specific implementation, the system allows any user in the chat session to share their screen with each of the other users in the chat session. In this specific implementation, this model for screen sharing does not include a meeting host, organizer, administrator, or leader. Rather, one person at any point in time can decide to start sharing their screen. This model provides a "democratic" form of sharing which is unique—there is no "owner" or "host" of the session—anyone at anytime (provided no one else is currently sharing) can share their screen to everyone else.

A user's screen can be shared simultaneously or concurrently with two or more other users participating in the chat session. For example, there can be a third user C at a third client having a third display and participating in the chat session with first user A and second user B. When first user A decides to share their screen, a message inviting third user C is displayed or viewable within a chat window of third user C. When third user C accepts the invitation, a viewer plug-in is launched at the third client for third user C. Third user C can be viewing the information being displayed on first user A's screen at the same time that second user B is viewing the information being displayed on the first user A's screen.

In a specific embodiment, the shared display information is view-only. That is, a user who is sharing their screen maintains control of input to their client machine. The other users do not have remote control of the user's client machine. The other users are not able to provide input to the client machine (e.g., not able to control the mouse cursor). In this specific embodiment, screen sharing can be implemented without using a virtual network computing (VNC) client. In another specific embodiment, one or more other users may be able to remotely control the sharer's client machine.

A user can share their screen with the other users participating in the chat session while remaining in the context of the chat session. That is, the user does not have to leave the chat session window, access another external system for screen sharing that may involve external emailed URLs, passwords, meeting IDs, and so forth. Conversely, the other chat participants do not have to leave the chat session and search through their emails for the URLs. Having to leave in the middle of a chat session can be very disruptive.

A benefit or value-proposition of this system is maintaining the flow and context of the chat session while a screen sharing session is conducted in parallel. This allows for productive and efficient collaboration because users do not have to switch contexts. Users do not have to shift from what they are doing to doing something else in another tool and potentially risk security as most other tools use consumer solutions over public internet. Screen sharing can be initiated ad hoc and within a single browser window. For example, a screen sharing session can be conducted without having to first setup a formal meeting including a meeting time and date, meeting owner or host, meeting attendees, meeting ID and URL, meeting password, and so forth.

Collaboration in business and social settings is becoming the norm. For example, social and business network feeds have proliferated, chat applications, and other tools can be used for collaborating between people. As discussed in this patent application and illustrated in the attached figures, techniques and tools are provided to share a screen between users. In one implementation, the screen sharing may use a separate application to do the screen sharing. In another implementation, the screen sharing is run in a browser without the need to download or install additional software.

In an embodiment, a user can be in a text chat conversation with one or more colleagues. According to an embodiment, at any point in time, any person in that text chat session can instantly start sharing their screen with all others. This can be referred to as contextual collaboration—e.g., there is no need to leave the thread of this conversation or this group to collaborate in real-time.

An example of the flow to share a screen is as follows.

1. Start or join a chat session with another person using a chat panel of the chat module.

2. At any time, click the share screen icon in the chat panel to start sharing your screen.

3. The screen sharing icon reverses and a message "You are sharing your screen" appears in the chat panel and a small version of the screen sharing icon is shown to the bottom right of your photograph.

4. The desktop controller (floats above the screen) appears with the message "Now Sharing" along with a green glowing icon, and an "x" box to stop sharing.

5. The other participant in the chat session sees a message in their chat panel that "Screen sharing is now in progress" with a small version of the screen sharing icon shown to the bottom right of the photograph of the person who is sharing.

6. A clickable system message says "View <initiating user's (e.g., Steve's)> Screen" After clicking this system message, the Viewer automatically appears in front of the browser window. In a specific implementation, a method for sharing a screen view of a user computer includes initiating and participating in a chat session. While participating in the chat session, selecting a screen sharing control, and sending a view of the user computer to a second user computer.

Figure 2A:
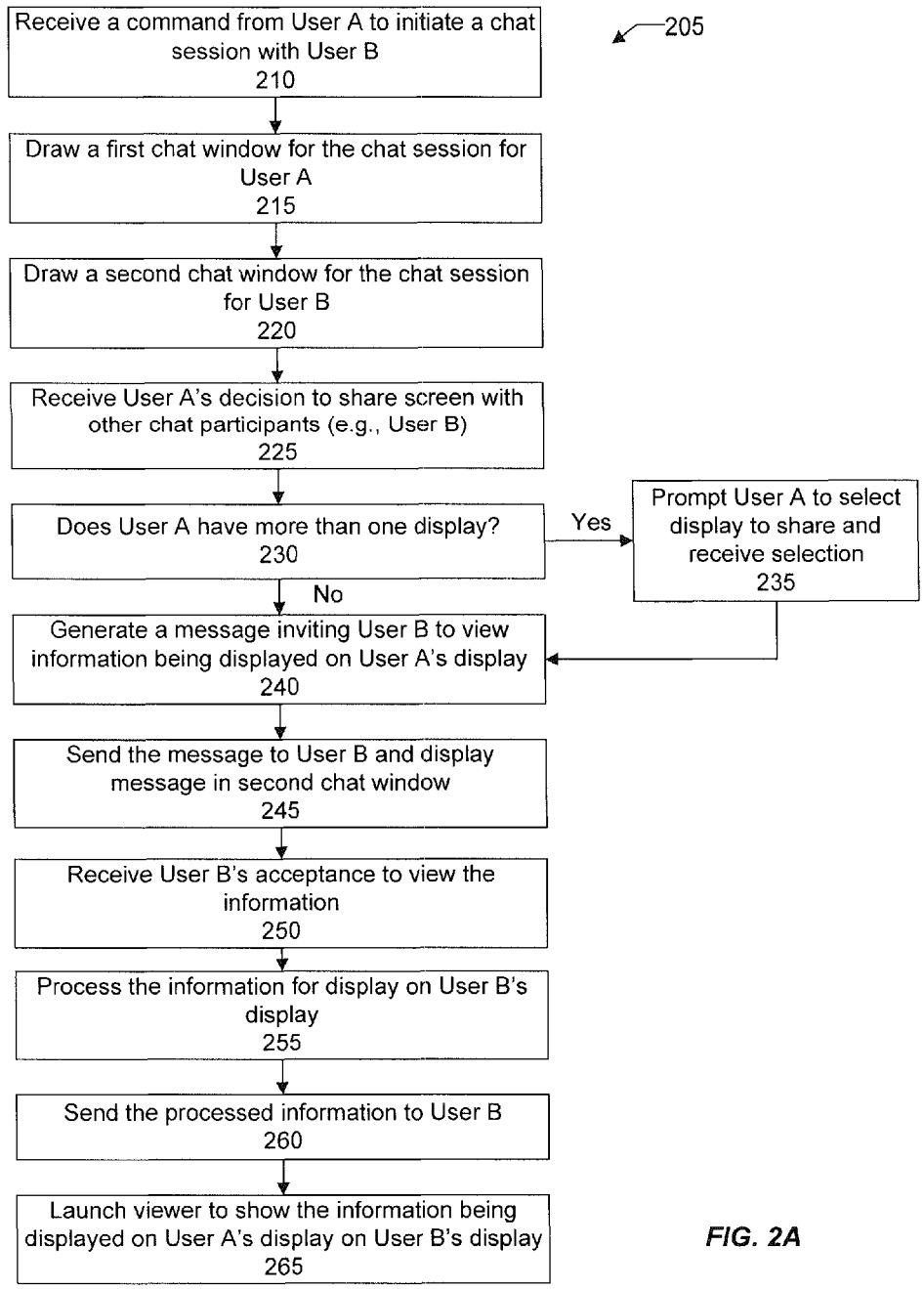
FIG. 2A illustrates an overall flow diagram for screen sharing in an embodiment.

FIG. 2A is an operational flow diagram 205 illustrating a high level overview of a technique for screen sharing in a specific embodiment. Some specific flows are presented in this application, but it should be understood that the invention is not limited to the specific flows and steps presented. A flow of the invention may have additional steps (not necessarily described in this application), different steps which replace some of the steps presented, fewer steps or a subset of the steps presented, or steps in a different order than presented, or any combination of these. Further, the steps in other implementations of the invention may not be exactly the same as the steps presented and may be modified or altered as appropriate for a particular application or based on the data.

In a specific implementation, the collaboration platform includes a networked application or an application product accessible through a browser. In this specific implementation, there is a presence engine that detects an online status of a user. A user logged into the application may view an online status of other users in the organization. The online status can indicate whether or not another user is available to chat. A logged in user can engage in a discussion (e.g., exchange chat messages) with one or more other logged in users. A discussion can be around an object associated with, managed by, or accessible through the collaboration platform such as a file, document, page, or other data object.

For example, a first user may be viewing a file and notice that a second user is also viewing the same file. The first user can start an ad hoc chat with the second user. During the chat, the first user can share their screen with the second user. After the first user stops sharing their screen with the second user, the second user can immediately (e.g., via a single click) begin sharing their screen with the first user.

Referring now to FIG. 2A, in this specific implementation, in a step 210, the system receives a command from user A to initiate a chat session with user B. In a step 215, the system draws a first chat window for the chat session for user A. In a step 220, the system draws a second chat window for the chat session for user B. The system manages the users' exchange of messages through the chat windows.

In a step 225, the system receives a decision or request from one of the users (e.g., user A) to share their screen with another user participating in the chat session (e.g., user B). In a step 230, the system detects whether or not the user has more than one screen. For example, some users may have more than one screen or monitor such as two, three, or more than three monitors. In a step 235, if user A has more than one screen, the system prompts the user to select which screen to share with user B.

In a step 240, the system generates or provides a message inviting or prompting user B to view information being displayed on user A's display. The message may be generated at the server automatically or generated automatically at a client machine. In a specific implementation, the message includes the following text: "<user A name> would like to share their screen."

In a step 245, the system sends or transmits the message from the server to user B (i.e., user B's client computer) so that the message can be displayed in user B's chat window (e.g., the second chat window). In this specific implementation, the generated system message is displayed in the same chat window where the chat, discussion, threaded discussion, or instant message exchange between users A and B is occurring. In this specific implementation, the message is not an email message. Rather, in this specific implementation, the message is a chat or instant message that appears in the chat window. That is, the message is viewable in the chat window.

For example, the chat window for user B (e.g., the second chat window) may include first, second, and third messages. The first message may be message text inputted by user A (e.g., "Hi user B how is the presentation coming along?"). The second message may be a reply inputted by user B (e.g., "Hi user A, the presentation is coming along great. Let me share my screen with you to show you what I have."). The third message may be generated by the system upon user A selecting the "share screen" option, (e.g., "User A would like to share their screen."). In a specific implementation, the messages are displayed chronologically. That is, the first message will be displayed in the chat window above the second message. The third message will be displayed in the chat window below the second message. In another specific implementation, the messages are displayed in reverse chronological order.

Displaying the system generated message in the chat window helps to maintain the flow and context of the chat session. User B will not have to change focus or switch or launch another application (e.g., email application) in order to view the screen sharing invite. In another specific implementation, the system generated message may instead or additionally be displayed outside the chat window. For example, the message may be displayed within a pop-up dialog box, sent via email, or both.

In a specific implementation, the displayed message is accompanied by a prompt or a clickable control or option within the chat window for user B to select in order to accept the screen sharing invitation. In this specific implementation, the clickable control includes a button that is displayed within the chat window. User B will not have to shift to a different tool and lose focus because the screen sharing control is displayed within the context of the chat window discussion. Further, there is no additional password that user B will have to enter in order to participate in the screen sharing session. In a step 250, the system receives user B's acceptance to view the information being displayed on user A's display.

Alternatively, the system may not receive user B's acceptance. User B, for any number of reasons, may not wish to view the information. For example, user B may be busy and the information may not be immediately important for user B to view. The system gracefully allows the chat session to continue even if the invitation to view the information is not accepted (e.g., clicked on) by user B. If a participant in the chat session does not accept the screen sharing invitation, other participants can still choose to accept the screen sharing invitation. The system allows each participant in a chat session to decide independently whether or not they wish to view the information.

In a step 255, the system processes the information being displayed on user A's display for display on user B's display. The processing can take into account factors such as user B's network connection (e.g., bandwidth), the capabilities of user B's client computer (e.g., processor speed, graphics card, or memory), the resolution of user B's screen, the size of user B's display, or combinations of these. This allows the system to tailor the displayed information as appropriate for user B's client computer. Such processing allows, for example, broadcasting video through screen sharing at about 15 to 20 frames per second or more without skipping problems.

As an example, if user B's bandwidth is limited or poor the system may downgrade the quality of the displayed information for user B so that user B does not experience dropped frames. In a specific implementation, the system provides an option to select the displayed image quality. For example, user B may be using a network connection that charges based on the amount of bandwidth consumed. An option to downgrade the displayed image quality can help to ensure that user B does not exceed a usage cap or threshold and incur data overage charges.

In a step 260, the system sends the processed display information to user B. In a step 265, the system invokes, launches, or loads a viewer plug-in to display the processed display information that is received at user B's client computer. The viewer window may be drawn at any position on user B's display. In a specific implementation, the viewer window is drawn so that it appears on top of or overlaid on the browser window. User B may resize and reposition the viewer window (e.g., click and drag the window to a different location on the display).

In a specific implementation, the viewer window is drawn at or near a center of the display. In this specific implementation, an area size of the viewer window is greater than an area size of the chat window. The viewer window may be drawn such that it at least partially overlaps the chat window. These drawing techniques help to provide a large viewing area for user B to see in the viewer the information that is being displayed on user A's display.

In another specific implementation, the viewer window is drawn so that it does not overlap the chat window. In this specific implementation, user B will be able to see the discussion with user A along with the information being shown on user A's screen because the viewer will not overlap the chat window. In this specific implementation, the viewer window may be drawn so that it is adjacent or next to the chat window. An edge of the viewer window may touch an edge of the chat window. For example, the viewer window may be positioned to the left-hand side of the chat window. The viewer window may be positioned to the right-hand side of the chat window. The viewer window may be positioned above the chat window. The viewer window may be positioned below the chat window. In another specific implementation, the chat window may be repositioned, resized, or both when the viewer window is drawn. For example, if the chat window is at or near a center of the screen, the chat window may be repositioned so that it is at or near an edge of the screen, while the viewer window is drawn at or near the center of the screen.

In a specific implementation, the viewer window shows the entire screen or desktop of user A. In another specific implementation, user A may select a portion of the screen or desktop to share. For example, user A may designate the portion to share by dragging a box around the portion to share, identify one or more open windows on the desktop to share, or both.

In a specific implementation, the system generates automatically a message to information user A that user A is sharing the screen. In a specific implementation, the message is displayed in user A's chat window. In a specific implementation, the message includes the following text, "You are sharing your screen." In another specific implementation, the message is displayed outside the chat window.

In a specific implementation, the system generates automatically a message to information user B that user B is now viewing user A's screen. In a specific implementation, the message is displayed in user B's chat window. In a specific implementation, the message includes the following text, "You started viewing <user A name>'s screen. In another specific implementation, the message is displayed outside the chat window.

FIGS. 2B-7 show some screen shots of a specific implementation of the system. In this specific implementation, the screen shots are of web pages displayed on an electronic screen or display to a user. The web pages include some examples of various graphical user interfaces (GUIs). The web pages are generated by a customer relationship management (CRM) product, and more specifically by a product referred to as Chatter, as provided by salesforce.com, inc. of San Francisco, Calif.

It should be appreciated, however, that the screen sharing techniques discussed in this patent application may be implemented in any product. These GUI screen shots and the accompanying description are provided merely as a sample implementation. It should be understood that the invention is not limited to the specific examples and features presented. A system of the invention may have additional features (not necessarily described in this application), different features which replace some of the features or components presented, fewer features or a subset of the features presented, or features in a different order than presented, or any combinations of these. Aspects (e.g., screens or web pages) of the invention may be modified or altered as appropriate for a particular application, industry, business, or use.

Figure 2B:
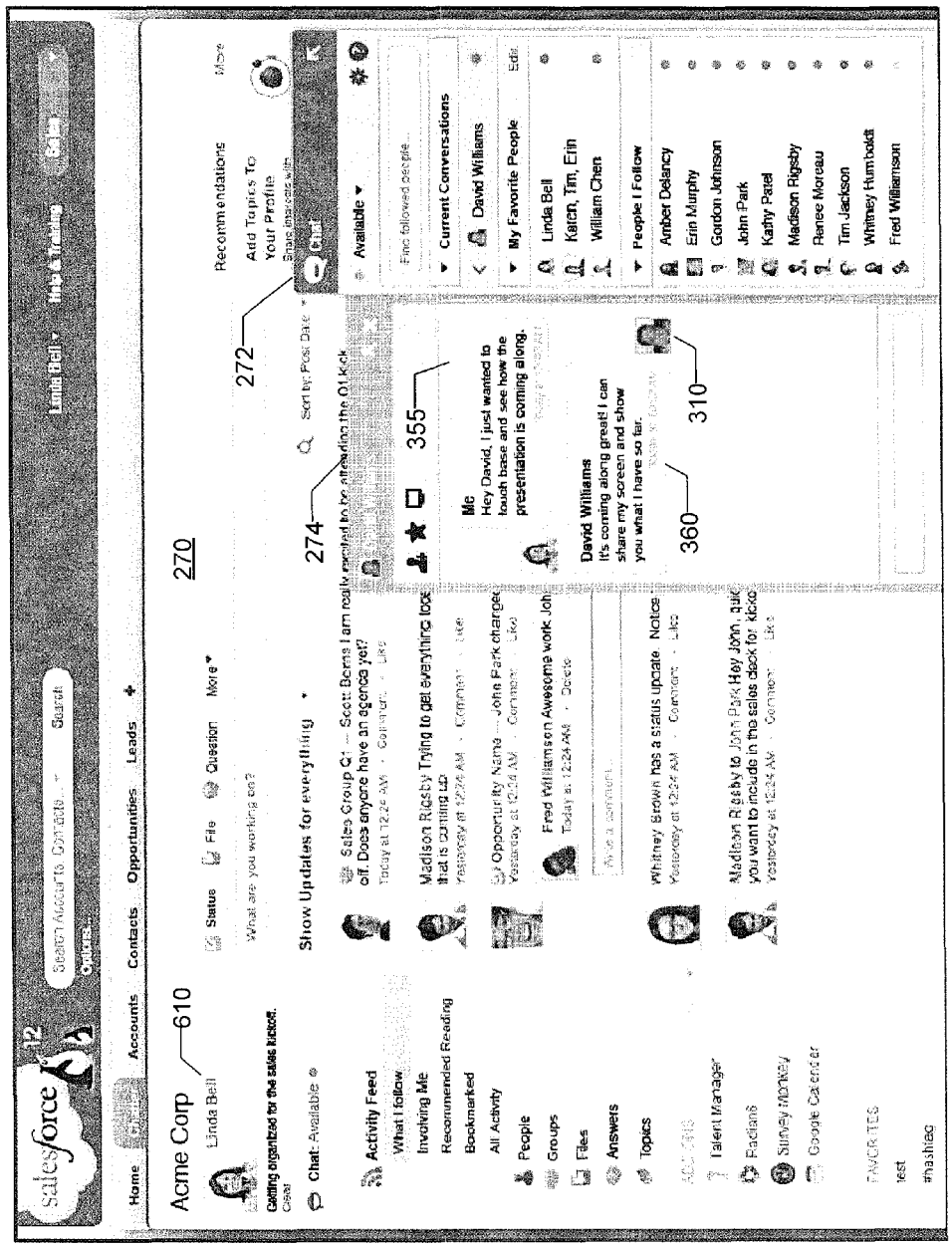
FIG. 2B illustrates a screen shot of a web page where first and second users are engaged in a chat in a first embodiment.

FIGS. 2B-7 show a sequence of a specific embodiment of a screen sharing operation among chat participant users. Referring now to FIG. 2B, there is a web page 270 being displayed on a screen of a second user B 610 (e.g., "Linda Bell"). Web page 270 includes a chat list 272 and a chat window or panel 274. The chat window is for a chat session or chat conversation that second user B is having with a first user A 310 (e.g., "David Williams").

For example, there is a message 355 and a message 360 displayed inside the chat window. Message 355 originates from or has been inputted by second user B and is directed to first user A. The message includes the text "Hey David, I just wanted to touch base and see how the presentation is coming along." Message 360 originates from or has been inputted by first user A in response to message 355. The message includes the text "It's coming along great! I can share my screen and show you want I have so far."

Figure 3:
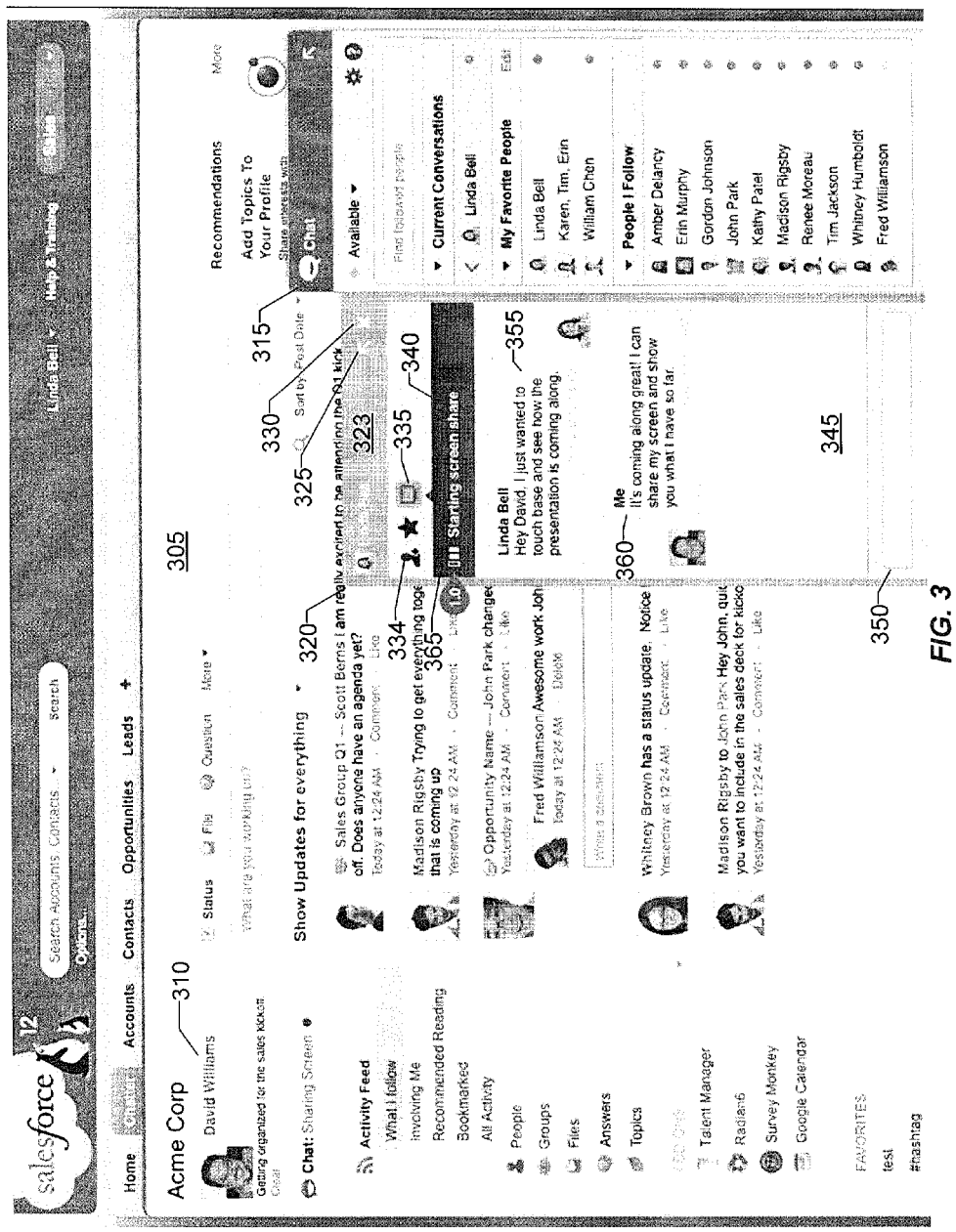
FIG. 3 illustrates a screen shot of a web page where the first user has decided to share their screen with the second user in a first embodiment.

Referring now to FIG. 3, there is a web page 305 displayed on a screen of a first user A 310 (e.g., "David Williams"). Web page 305 includes a chat list 315 and a chat window or panel 320.

In this example, the chat list includes a list of other people in the organization. The chat list includes several sections including a status drop down list for first user A to indicate their online status to other people in the organization (e.g., available or busy), an input box to search for other people, a section labeled "Current Conversations," a section labeled "My Favorite People," and a section labeled "People I Follow." There is an online status indicator (shown as a colored dot or circle) next to each listed person. In a specific implementation, the online status indicated is color-coded to indicate the availability of the person to chat. For example, a green status indicator may indicate that the person is available. A red status indicator may indicate that the person is not available.

As shown in the example of FIG. 3, the chat window is displayed adjacent or next to the chat list. In this specific implementation, a right-hand edge of the chat window is butted up against a left-hand edge of the chat list. The chat window includes a title bar 323 having a control 325 to popout or expand the chat window and a control 330 to close the chat window.

Within the chat window there is an add chat participants button 334, a screen sharing button 335, a screen sharing status banner 340, a threaded discussion or message region 345, and a message input box 350. In this specific implementation, the add chat participants and screen sharing buttons are located above the screen sharing status banner. The banner is located between the screen sharing button and the threaded discussion region. The message input box is located below the threaded discussion region.

The add chat participants button can be clicked to add other users to the chat session such as users listed in chat list 315. The threaded discussion region shows the exchange of messages between first user A 310 and a second user B (e.g., "Linda Bell"). In the example shown in FIG. 3, Linda Bell has sent a message 355 to David asking about a presentation: "Hey David, I just wanted to touch base and see how the presentation is coming along." David has responded with a message 360: "It's coming along great! I can share my screen and show you what I have so far." Each message is date and time-stamped.

In a specific implementation, as shown in the example in FIG. 3, screen sharing button 335 is accessible from, through, or via chat window 320. The user David can share his screen by clicking screen sharing button 335. This changes the screen sharing button from a first display state to a second display state to indicate that the button has been clicked. For example, the button may be grayed out to indicate that it has been clicked or pressed.

The screen sharing status banner displays the status: "Starting screen share" and includes a progress bar indicating the progress of the operation. In this specific implementation, the user (e.g., David) does not have to access a GUI separate from the chat window GUI in order to start a screen sharing session. This helps to streamline the user experience because the user does not have to switch to a different tool. Rather, a screen sharing session can be performed within the context of the chat session.

Figure 4:
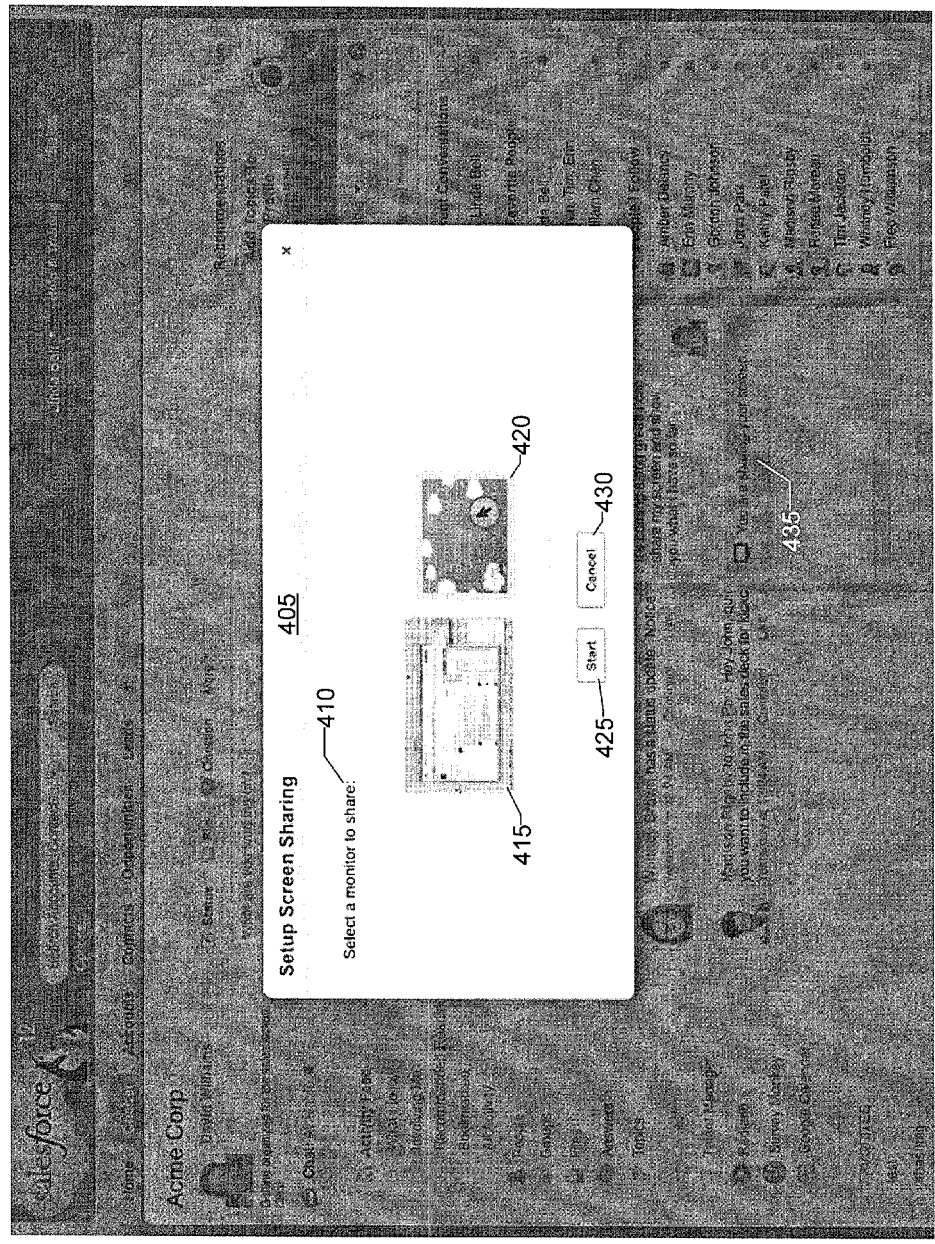
FIG. 4 illustrates a screen shot of a dialog box prompting the first user to identify the monitor to share in the first embodiment.

FIG. 4 shows a screen shot of a "Setup Screen Sharing" dialog box 405. In this example, first user A (e.g., "David Williams") has two monitors which have been detected by the system. The system is prompting the user to identify the monitor to share. Specifically, this dialog box includes a prompt 410, icons 415 and 420 below the prompt, and a start button 425, and a cancel button 430. The dialog box is displayed as an overlay or is superimposed over the web page. The web page is shaded so as to focus the user's attention on the dialog box.

Prompt 410 is for prompting the user (e.g., first user A "David Williams") to select a monitor to share. Icon 415 corresponds to a first detected monitor. Icon 420 corresponds to a second detected monitor. The icons include miniature or reduced image representations of the information being displayed on the respective monitor.

To select the monitor or screen to share, first user A can click or otherwise highlight the appropriate icon (e.g., icon 420) and click start button 425. As shown in FIG. 4, the system generates a message 435 indicating to first user A that they are sharing their screen. The system displays the message in the chat window for first user A to view. First user A can cancel the screen share operation by clicking cancel button 430.

Figure 5:
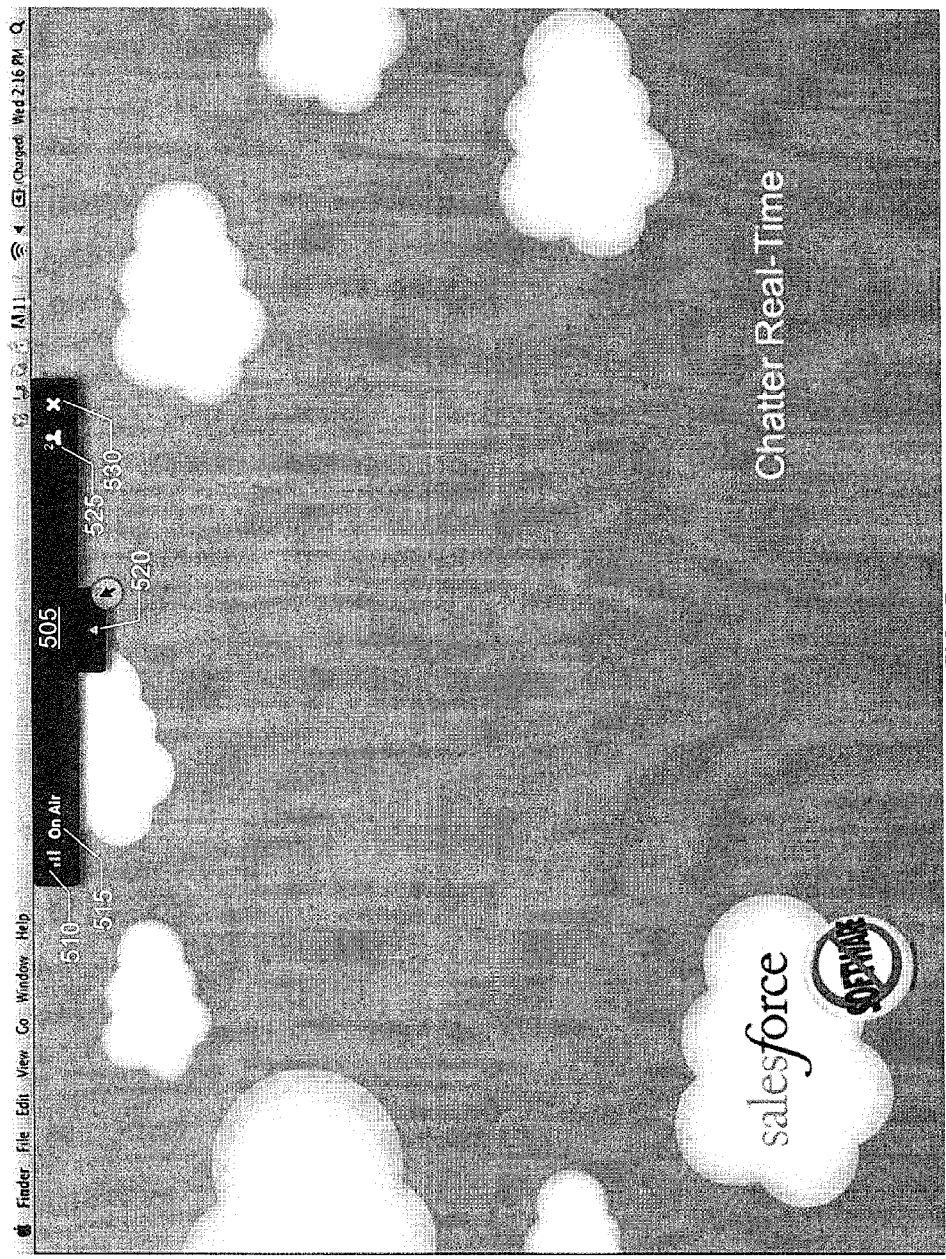
FIG. 5 illustrates a screen shot of the screen the first user has decided to share in the first embodiment.

FIG. 5 shows an enlarged example of the particular screen (or monitor) that first user A has decided to share. FIG. 5 shows the information being displayed on the selected screen. A pull down box 505 is superimposed over the screen image. The pull down box includes a connection quality indicator 510, a status region 515, a pull down control 520, a screen sharing participant number 525, and an exit icon 530.

The connection quality indicator indicates first user A's capability (e.g., network capability or bandwidth) to conduct a screen sharing session. The status region includes the status of the screen sharing session (e.g., "On Air" to indicate that a screen sharing session is currently in progress). The pull down control allows first user A to toggle between a collapsed and expanded state of the pull down box. The screen sharing participant number lists the number of people from the chat session who are participating in the screen sharing session. The exit icon can be clicked to end the screen sharing session.

Figure 6A:
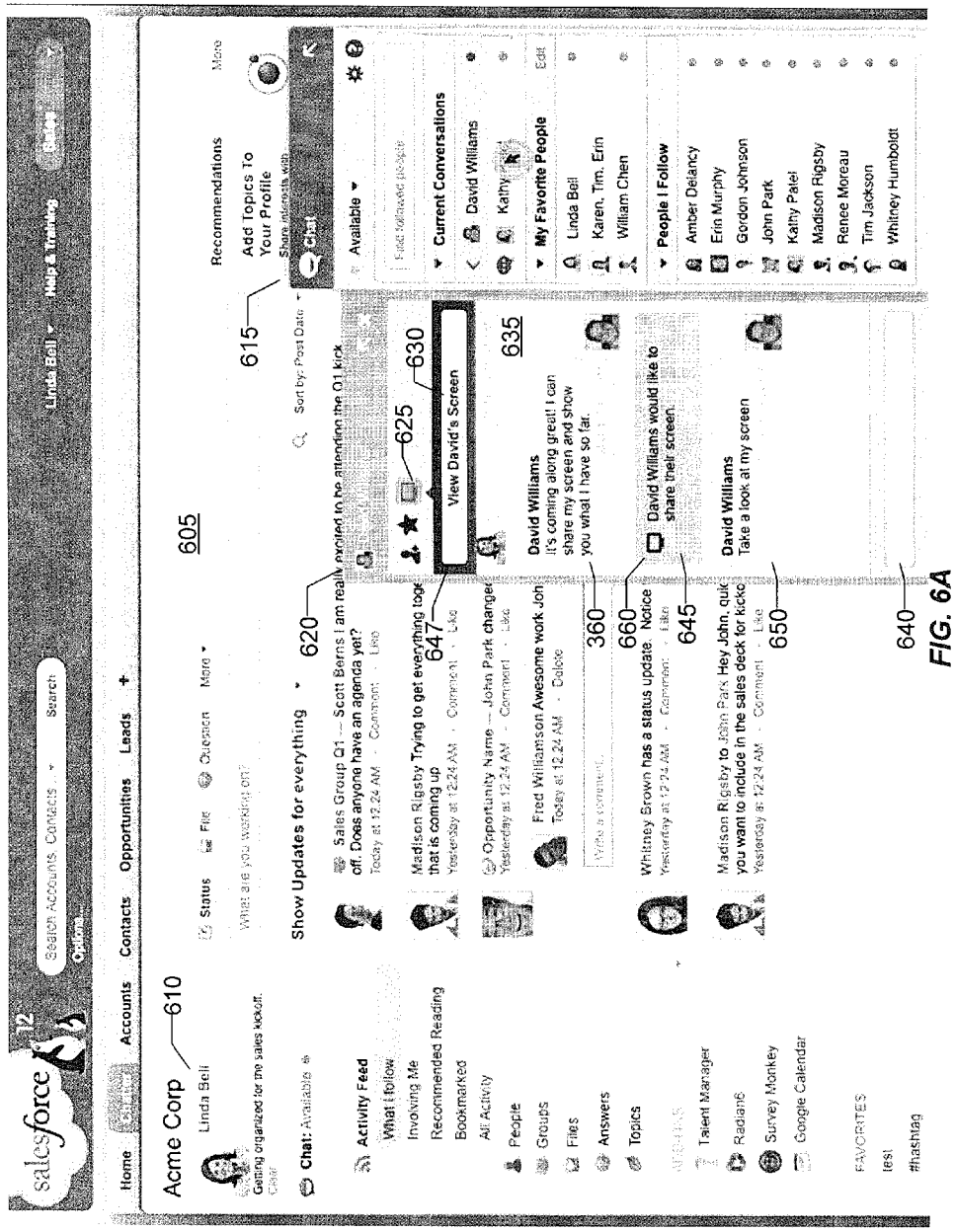
FIG. 6A illustrates a screen shot of a web page of the second user being invited to view the screen of the first user in the first embodiment.

FIG. 6A shows a screen shot of a web page 605 of a second user B 610 (e.g., "Linda Bell" who is participating in the chat session with first user A "David Williams." This web page includes information similar to that shown in web page 305 (FIG. 3). For example, FIG. 6A shows a chat list 615 and a chat window or panel 620. Chat list 615 and chat window 620 are similar to chat list 315 and chat window 320, respectively, as shown in FIG. 3 and discussed above. For example, chat window 620 includes a screen sharing button 625, a screen sharing status banner 630, a threaded discussion or message region 635, and a message input box 640.

In chat window 620, screen sharing button 625 is shaded to indicate that it has been disabled because there is a screen sharing session with another chat participant (e.g., user A) that is currently in progress. In this specific implementation, only a single user at a time can be sharing their screen with other users in the chat session. In another specific implementation, there can be multiple users at a time (i.e., two or more users) who can be simultaneously sharing screens with the other users in the chat session.

Threaded discussion region 635 includes message 360. Message 360 is from first user A and is a reply to message 355 (FIG. 3). The threaded discussion region further includes a system generated message 645: "<first user A (e.g., "David Williams")> would like to share their screen." The message is time and date stamped. That is a time and date has been included with the message. The message has been inserted into the discussion thread according to its time and date, i.e., inserted chronologically or according to the timeline of events. For example, message 645 is inserted below message 360 because, in this example, after first user A inputted message 360, first user A clicked button 335 to initiate the screen sharing operation (see FIG. 3). Message 645 is above a message 650 because after first user A initiated the screen sharing session, first user A, in this example, inputted the text "Take a look at my screen."

Displaying system generated message 645 in accordance with the timeline of events and inside the chat window in which the accompanying or associated discussion is taking place helps to improve the user experience. Specifically, as discussed above, users do not have to switch contexts or access a different system. Further, the chat session transcript will reflect (automatically, i.e., without user intervention) that a screen sharing session had taken place—including the context or surrounding events in which the screen sharing session took place. This makes it easy for users to trace what occurred and when.

Screen sharing status banner 630 includes a button 647 labeled "View <first user A name's> Screen." The button may be displayed with message 645. Second user B can click the button which will automatically launch a viewer plug-in. Thus, with a single click, second user B can be viewing the information being shown on first user A's display. More particularly, in a specific implementation, when the user gets an invite from another user to participate in a screen share, the area below the icon toolbar will expand and button 647 to view the other user's screen is shown. When another user initiates a screen sharing, a system generated message 645 is shown within the chat conversation.

If the plug-in has not been installed, or there is an update to the plug-in a message 658 (FIG. 6B) may be displayed within the screen sharing status banner. Message 658 includes the text "Installing plug-in" to inform the user that an install is happening.

Figure 6B:
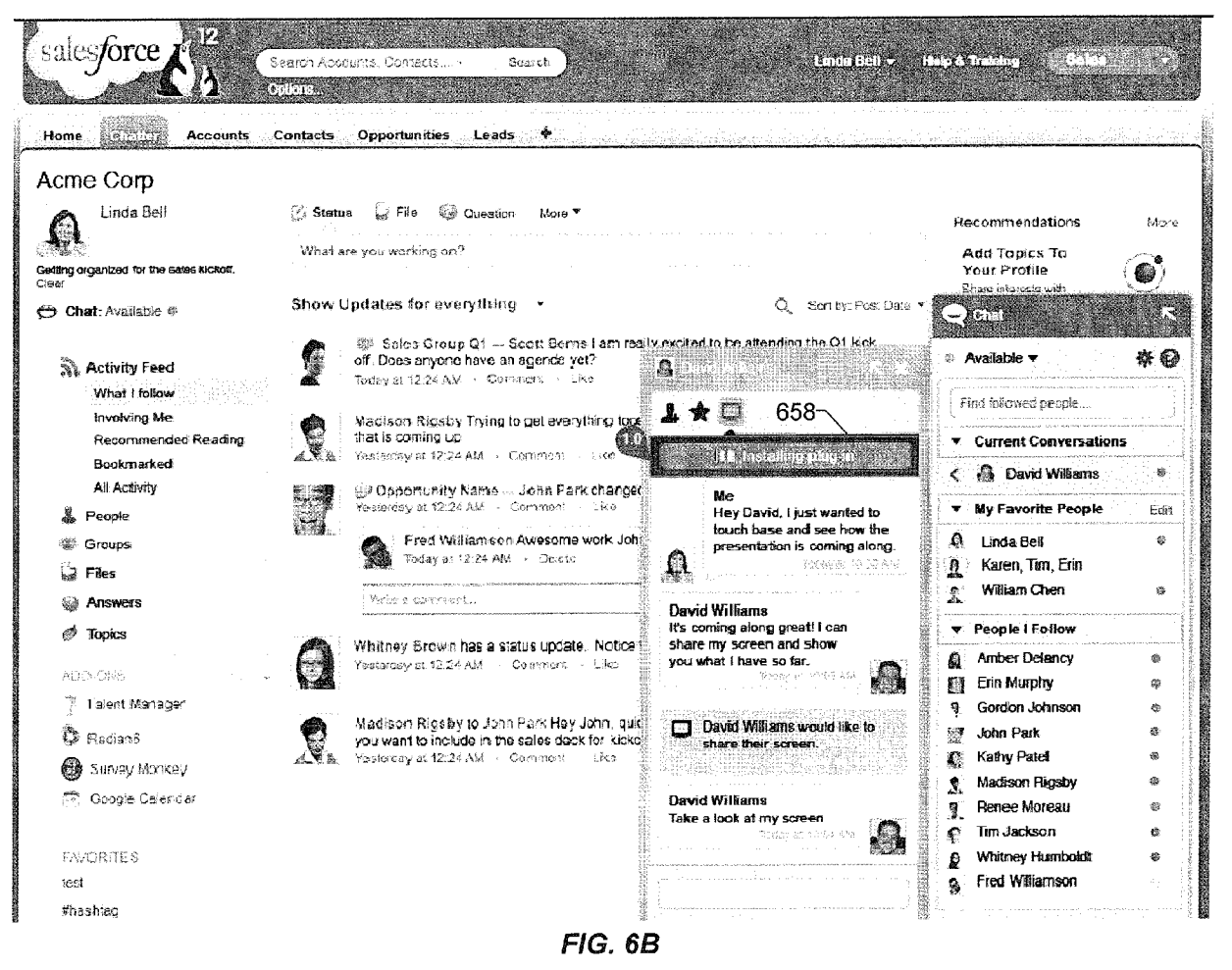
Figure 6C:
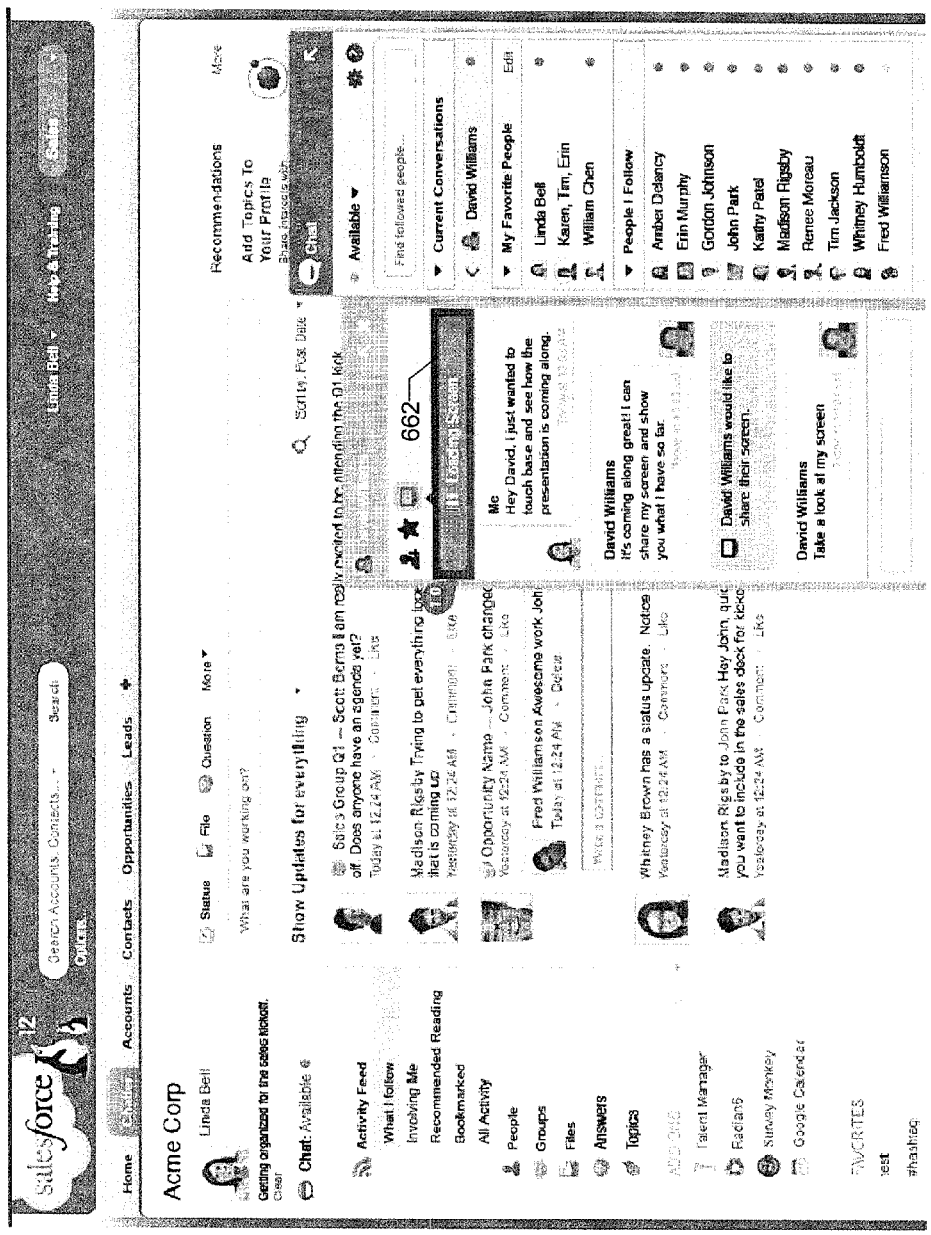
FIG. 6C illustrates a screen shot of a web page where the screens sharing is loading in the first embodiment.

As shown in FIG. 6C, after the plug-in has been installed the viewer will begin loading. A message 662 may be displayed within the screen sharing status banner. Message 662 includes the text "Loading Screen" to inform the user that the viewer is loading. In a specific implementation, until the viewer is fully loaded the loading message will be shown.

Figure 6D:
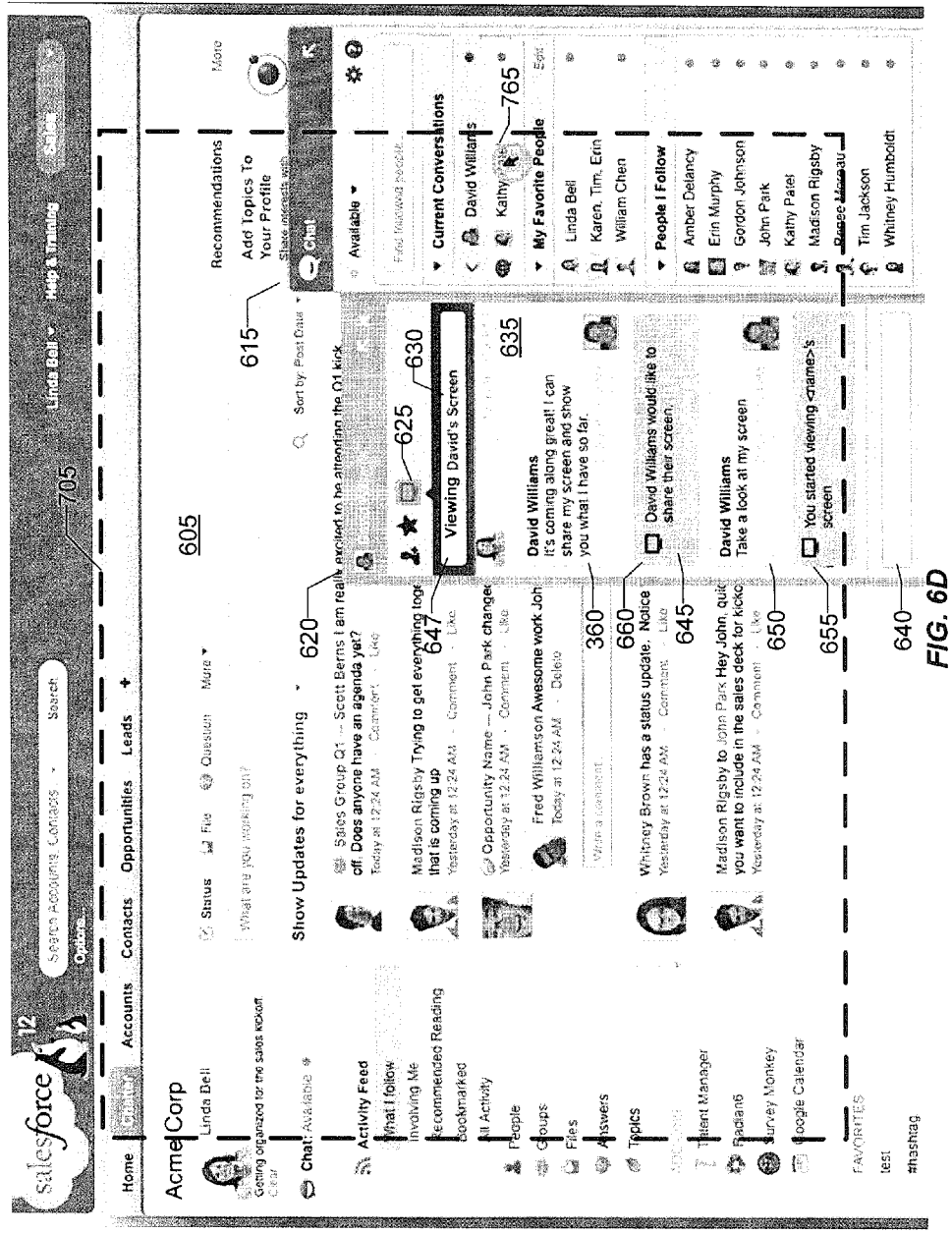
FIG. 6D illustrates a screen shot of a web page of the second user after the second user has accepted the invitation to view the screen of the first user in the embodiment illustrated in FIG. 6A.

More particularly, FIG. 6D shows second user's display in a state after second user B has clicked button 647 to view first user A's screen and the viewer has been installed (if needed) and loaded (see FIGS. 6B-6C). By clicking button 647, second user B has accepted first user A's invitation to view the information being displayed on first user A's screen. In a specific implementation, upon acceptance of the invitation being received by the system, the system launches or invokes a viewer having a viewer window 705.

The viewer window is represented in FIG. 6D as a broken line to show that a system generated message 655 is inserted into the threaded discussion to indicate that second user B has started viewing first user A's screen. (See FIG. 7 for a discussion of the viewer window). Thus, in this specific implementation, once the user has successfully joined the screen sharing session, a system message 655 is shown confirming that they are viewing another user's screen. When the user is viewing a screen share, they can still send and receive chats. They can also join any new incoming invites to view a screen share (such as an invite from a third user C 765—see FIG. 7B) as well as share their own screen.

As shown in FIG. 6D, the label for button 647 has been updated to indicate the screen sharing status. In this example, the label for button 647 has changed from "View David's Screen" to "Viewing David's Screen." In a specific implementation, button 647 also provides a mechanism to reopen viewer window 705. For example, if during the screen sharing session second user B closes viewer window 705, second user B can reopen or get the viewer window back by clicking button 647.

In a specific implementation, the system generated messages (e.g., messages 645 and 655) are accompanied by a visual indicator to indicate that the messages have been generated by the system instead of having been input by a user. The system generated messages originate from the system rather than a user. In a specific implementation, the system generated messages are shown against a background color that is different from a background color of the threaded discussion region. In this specific implementation, the background color of the threaded discussion region is white and the background color of the system generated message is grey.

In this specific implementation, the messages are accompanied by a symbol 660. In this specific implementation, the symbol resembles a monitor. The use of a monitor symbol helps to indicate that the messages were generated by the system as part of the screen sharing operation. It should be appreciated, however, that the system may use any visual indicator or combination of visual indicators in order to visually distinguish system generated messages from user generated messages in the chat window. Visual indicators may include, for example, different colors, background colors, text colors, text style or font style (e.g., bold, italics, underling), font size, symbols, and so forth.

Figure 7A:
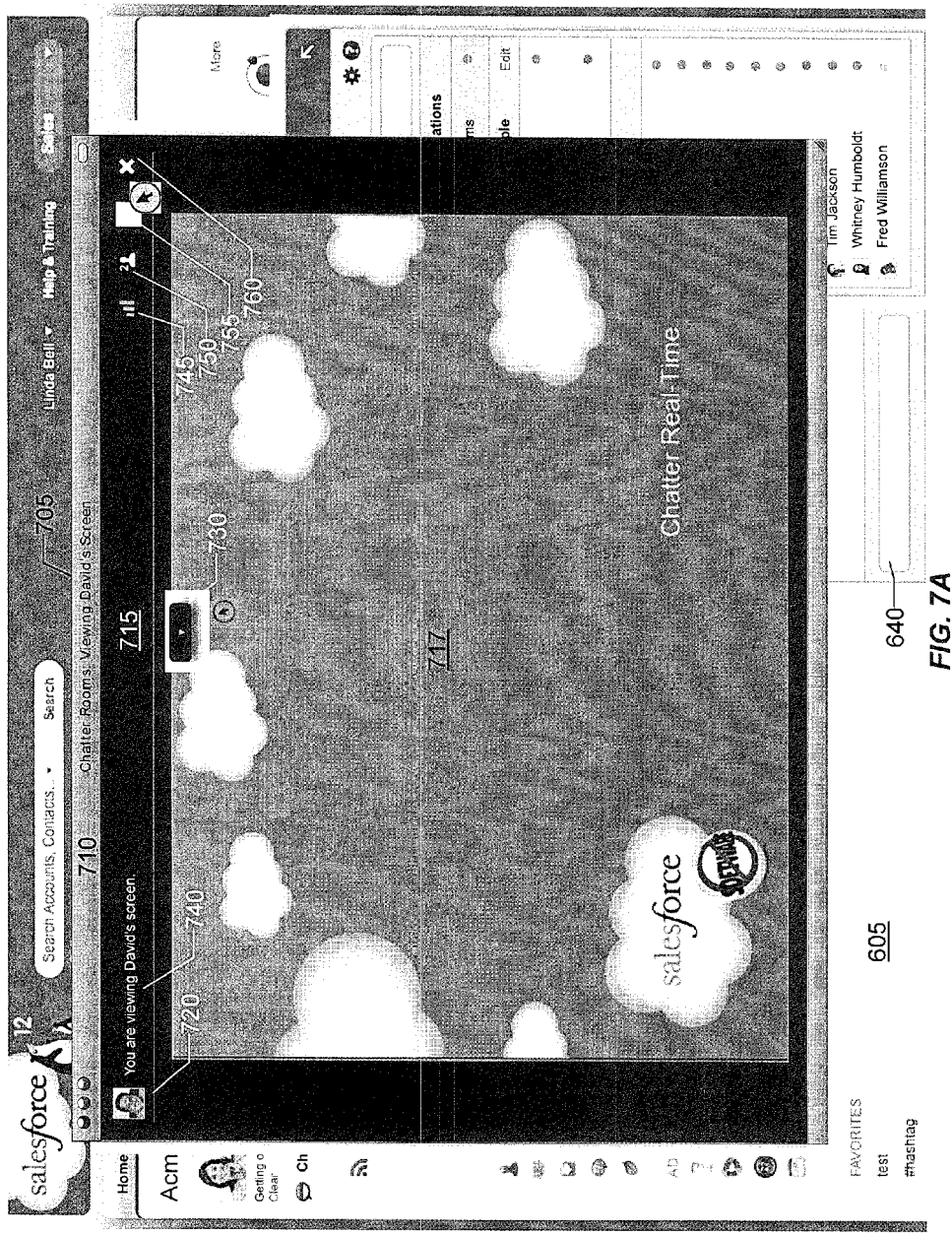
FIG. 7A illustrates a screen shot of a viewer showing the information being displayed on the first user's screen for the second user to view in the first embodiment.

FIG. 7A shows a screen shot of web page 605 that includes viewer window 705 which was represented by the broken line in FIG. 6D. This screen shot shows a view of second user B's screen after second user B has clicked the button labeled "View <first user A's (e.g., David's)> Screen" (see 647, FIG. 6A). Clicking the button causes the system to invoke, trigger, or launch a viewer plug-in. The viewer plug-in draws or opens a viewer having viewer window 705. Upon the second user B clicking the view button, the system can start up the viewer automatically with no user intervention. Second user B does not have to undertake the cumbersome steps of accessing another tool and switching contexts for the screen sharing.

Viewer window 705 includes a title bar 710, a header 715, and a screen viewing region 717. The header includes a thumbnail 720, a pull down control 730, a status region 740, a connection quality indicator 745, a screen sharing participant number 750, an expand screen icon 755, and an exit icon 760.

Within header 715, the title bar includes the title of the viewer window, e.g., "Chatter Rooms: Viewing David's Screen." The thumbnail includes a reduced-size picture of the chat participant who is sharing the screen who may be referred to as the sharer. The status region includes a status of the screen sharing session, e.g., "You are viewing David's screen." The connection quality indicator indicates second user B's capability or network bandwidth to participate in the screen sharing session. The screen sharing participant number lists the number of people from the chat session who are participating in the screen sharing session. The expand screen icon can be toggled to expand and collapse the viewer window between full size and reduced size. The exit icon can be clicked to close the viewer window. The pull down control can be toggled to collapse and expand the header. Screen viewing region 717 shows the information being displayed on first user A's screen.

The system can allow other users to join a chat session having a screen sharing session in progress. For example, first user A or second user B may invite third user C to join the chat session while second user B is viewing the information being displayed on first user A's display. In this specific implementation, upon third user C joining the chat session, the system draws a chat window for the chat session on third user C's display. The system generates a message indicating that a screen sharing session is now in progress. The system displays the system generated message in the chat window for third user C to view. Thus, the other chat session participants do not have to type the message. Third user C can view the information being displayed on first user A's screen in a manner similar to second user B. In other words, the system message permits late joining participants (e.g., third user C) to see that screen sharing is in progress. The other chat participants do not have to manually inform third user C of the screen sharing because the message is generated by the system. This helps to reduce the amount disruption when a new (or late joining) participant joins a chat session.

Referring now to FIG. 3, in a specific implementation, the system provides for stopping the screen sharing by toggling or clicking screen share button 335. Having a single button to control the starting and stopping of a screen sharing session helps to conserve screen real estate. In another specific implementation, however, starting and stopping a screen sharing session can be performed by two different buttons. In a specific implementation, upon the system receiving a command to stop the screen sharing session, the system displays a dialog box prompting the user (e.g., first user A) to confirm that they want to stop the screen sharing session. The dialog box includes a button labeled "OK" and a button labeled "Cancel."

Clicking the "OK" button stops or terminates the screen sharing session. The system can generate a message indicating that screen sharing has stopped. The system can display the message in each of the chat windows of the chat session for the chat participants (e.g., first user A and second user B) to view. First user A can begin another screen sharing session by again clicking screen sharing button 335. Alternatively, second user B can start a screen sharing session with first user A in a similar manner, e.g., by clicking the screen sharing button displayed in second user B's chat window.

In a specific implementation, a first chat participant can initiate a screen sharing session from a chat window of a chat session. The chat window may remain in focus, highlighted, or active while the screen sharing session is initiated, i.e., the focus does not shift to a different window. Similarly, a second chat participant may accept a screen sharing invitation from the first chat participant without leaving the chat window of the chat session. The chat window for the second chat participant may remain in focus, highlighted, or active while the second chat participant accepts the screen sharing invitation (e.g., clicks the button to view the screen of the first chat participant).

Figure 7B:
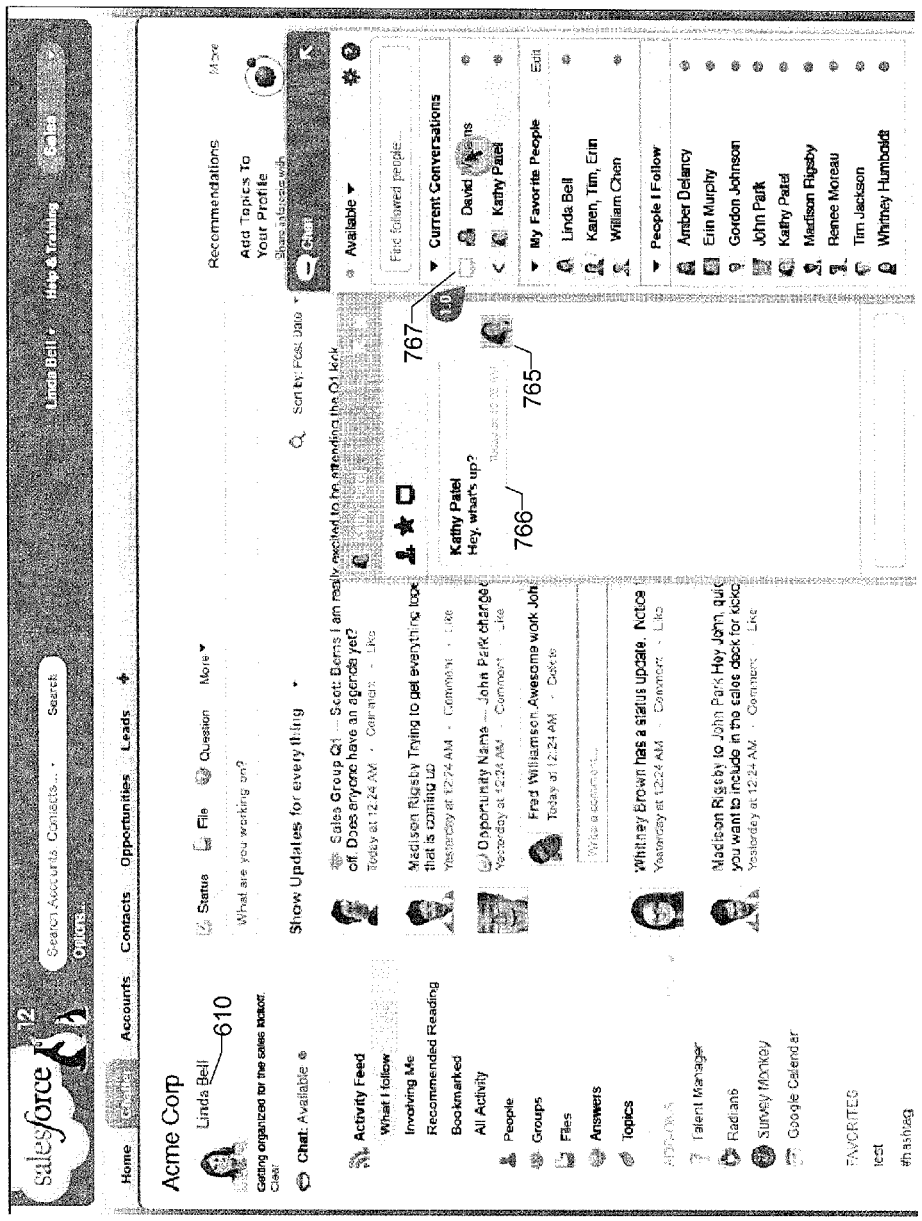
FIG. 7B illustrates a screen shot of a web page where the second user is having a chat with a third user while a screen share with the first user is in progress in the first embodiment.

FIG. 7B shows an example of second user B 610 having another chat session with a third user C 765 (e.g., Kathy Patel) while second user B is engaged in a screen sharing session with first user A. In this example, third user C has inputted a message 766 directed to second user B. As shown in FIG. 7B, the message from third user C to second user B includes the text "Hey, what's up."

The system can support multiple conversations or chat sessions while a screen sharing session is in-progress. In a specific implementation, when a user receives a new incoming chat conversation or initiates a new conversation, the conversation that is currently using the screen sharing viewer is highlighted by using a screen share icon 767 to the left of the profile image.

Figure 7C:
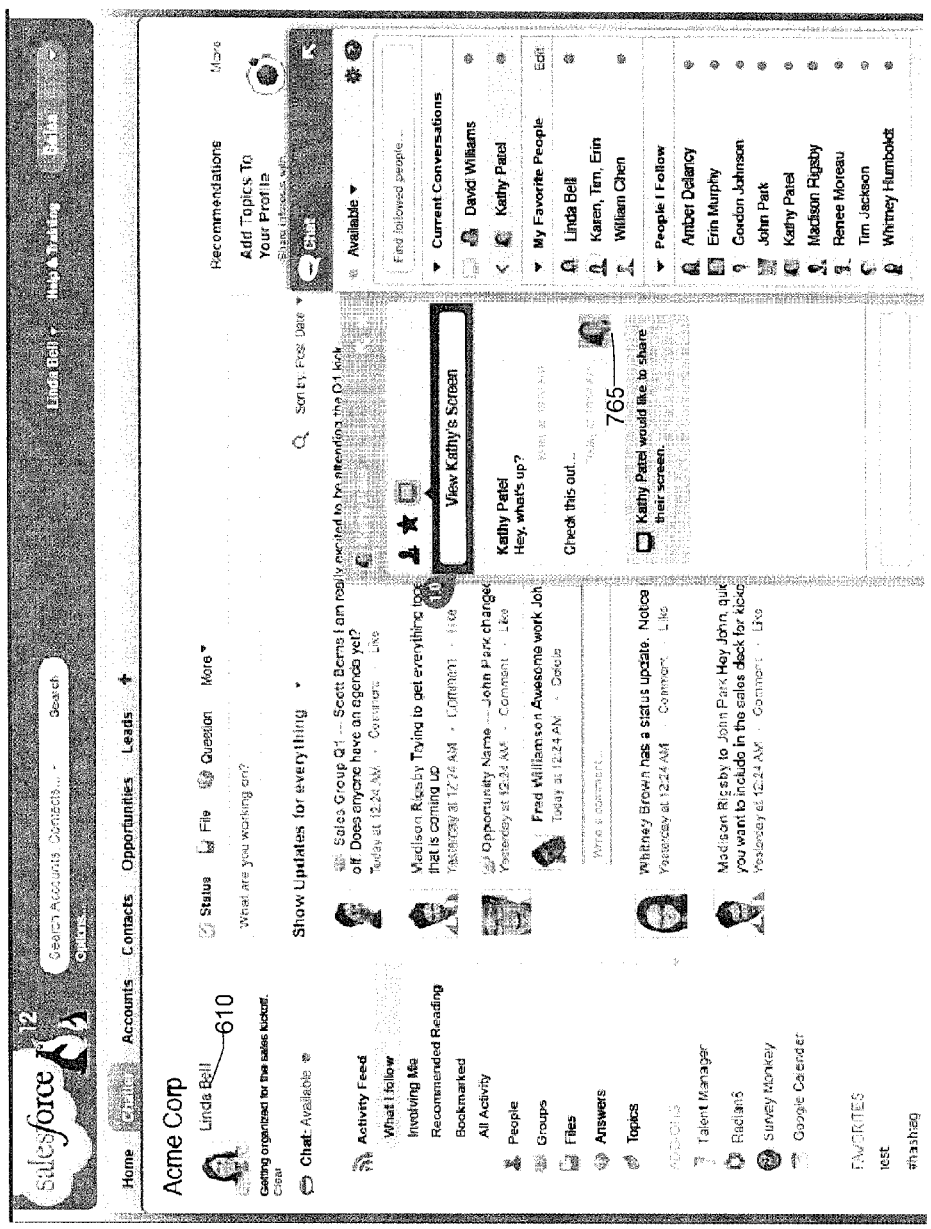
FIG. 7C illustrates a screen shot of a web page where the second user has received a screen sharing invite from the third user while a screen share with the first user is in progress in the first embodiment.

FIG. 7C shows an example of second user B 610 receiving a screen sharing invitation from third user C 765 while second user B is engaged in a screen sharing session with first user A (i.e., David Williams). In this specific implementation, when a user is viewing another screen share, they can still receive other invites to participate in other screen share sessions.

Figure 7D:
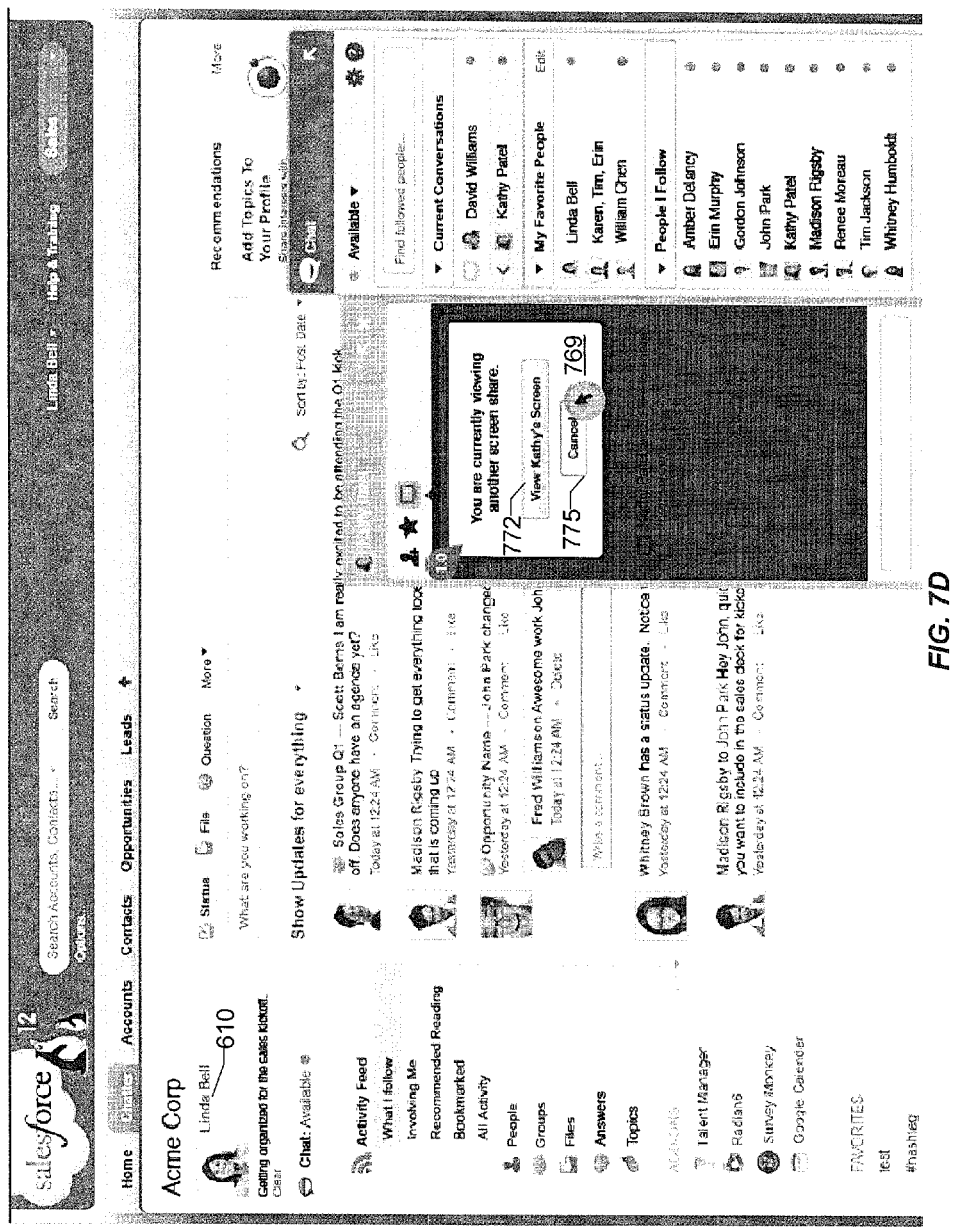
FIG. 7D illustrates a screen shot of a web page where the system has informed the second user that they are currently viewing another screen share in the first embodiment.

Referring now to FIG. 7D, when a user is viewing another screen share and they accept an invite to view another screen share, the system generates and displays a message 769 informing them that they are in another screen share session. Message 769 includes a button 772 and a button 775. The user is given the opportunity to join the new screen share session (e.g., by clicking button 772) or cancel (e.g., by clicking button 775). If the user cancels, they will still be able to view the screen share at any time as long as the screen share is still in session.

In a specific implementation, the system can support a user having multiple, i.e., two or more, concurrent screen sharing sessions. In this specific implementation, there can be a first user at an electronic screen. The electronic screen displays a first viewer window, and a second viewer window. The first and second viewer windows may be displayed at the same time or simultaneously. The first viewer window is associated with a first chat session. The first chat session includes the first user, a second user, and does not include a third user. The first chat session may include a first chat window that displays messages from the first and second users, but does not display messages from the third user. The first viewer window displays information being shown on an electronic screen of the second user.

The second viewer window is associated with a second chat session. The second chat session includes the first user, the third user, and does not include the second user. The second chat session may include a second chat window that displays messages from the first and third users, but does not display messages from the second user. The second viewer window displays information being shown on an electronic screen of the third user.

In another specific implementation, there can be a first user engaged in first and second chat sessions. The first chat session includes the first user, a second user, and does not include a third user. The second chat session includes the first user, the third user, and does not include the second user. During the first chat session, the first user may receive and accept a first invitation from the second user for a first screen sharing session. Upon accepting the first invitation, a viewer window is opened for the first user. The viewer window displays first information being shown on a screen of the second user.

During the first screen sharing session, the first user receives a second invitation from the third user for a second screen sharing session. In this specific implementation, if the first user accepts the second invitation, the system replaces the first information being displayed in the viewer window with second information, the second information being information shown on a screen of the third user.

If the first user does not accept the second invitation, the system does not replace the first information being displayed in the viewer window with the second information. After the first user rejects the second invitation, the first user may change their mind and desire to join the second screen sharing session. The system allows the first user to join the second screen sharing session even though the first user had initially rejected the second invitation to join the second screen sharing session. Upon the first user joining the second screen sharing session, the system may replace the first information being displayed in the viewer window with the second information. Alternatively, the system may open a second viewer window to display the second information.

Figure 7E:
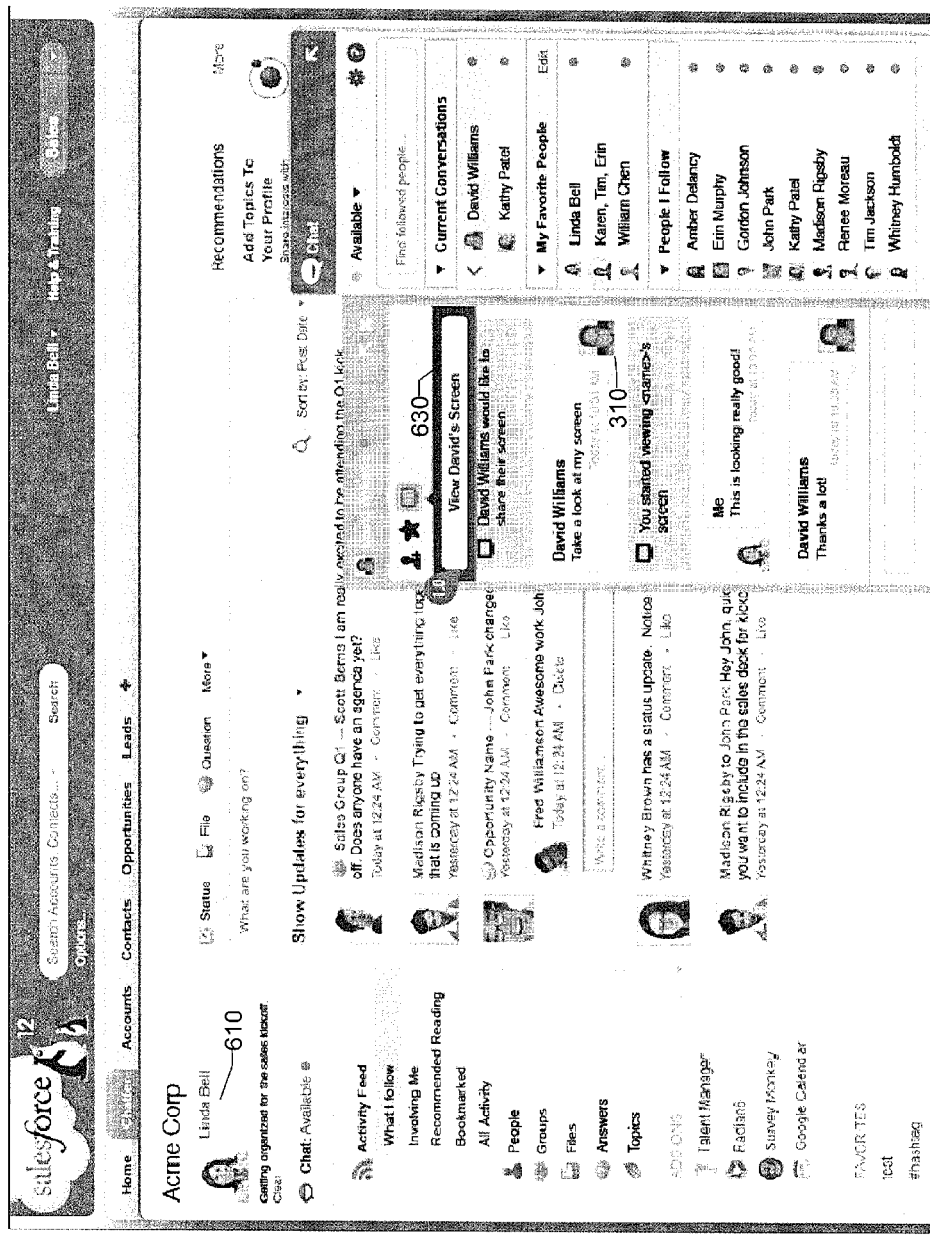
FIG. 7E illustrates a screen shot of a web page where the second user can easily toggle between different screen shares in the first embodiment.

FIG. 7E shows an example of second user B 610 being able to easily toggle back and forth from current conversations in order to jump right back into a screen share if it is still in session. For example, referring now to FIG. 7D, second user B 610 may click button 772 to accept the invitation from third user C to view the information being shown on the third user's screen. Upon second user B accepting the invitation from third user C, the system displays in a viewer window for second user B the information being shown on the third user's screen. Referring now to FIG. 7E, after second user B 610 has accepted the invitation from third user C, second user B may desire to return to the screen sharing session with first user A 310. Second user B can return to the screen sharing session with first user A by clicking button 630.

Figure 7F:
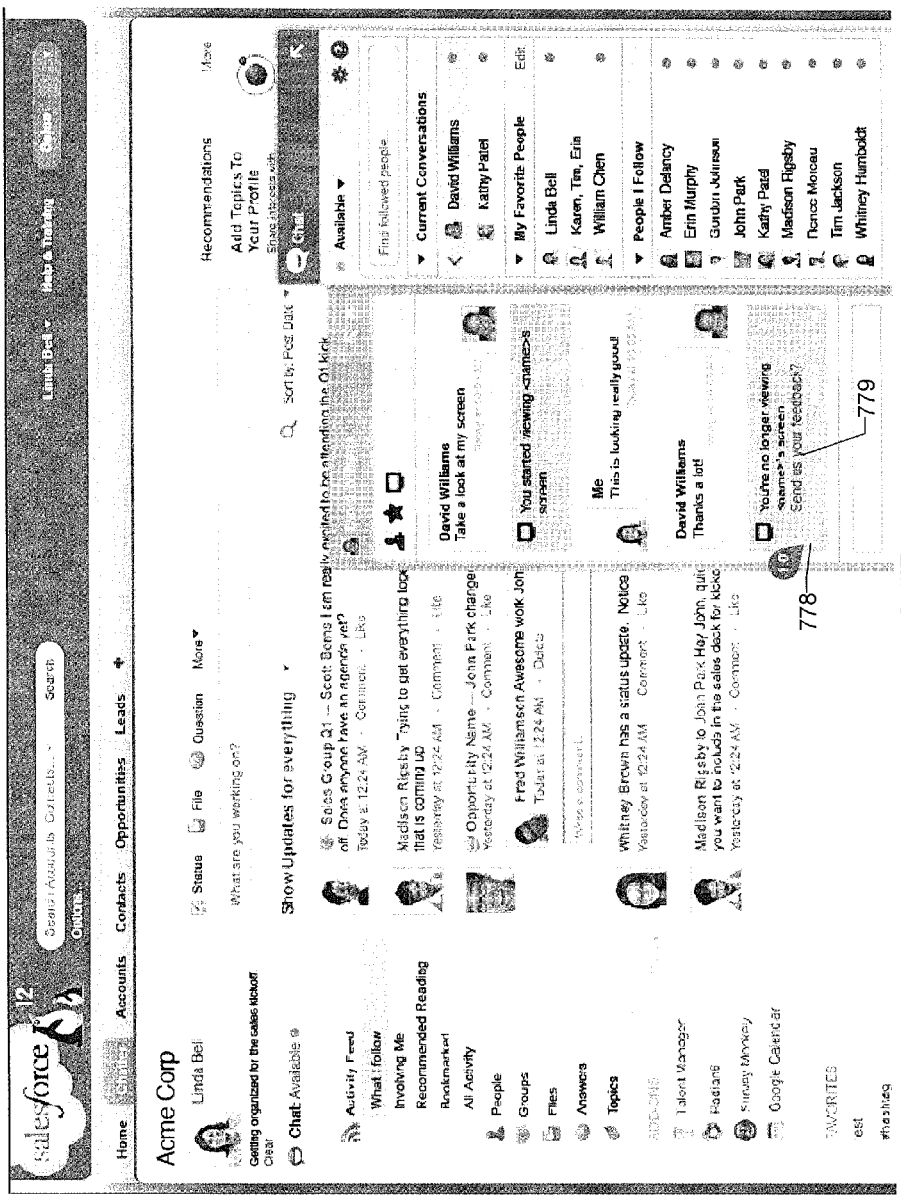
FIG. 7F illustrates a screen shot of a web page where the screen sharing session has ended in the first embodiment.

FIG. 7F shows an example where a screen sharing session has ended. In a specific implementation, once the presenter has ended a screen share, the viewer is shown a system message informing them along with an opportunity to submit any feedback they might have. More particularly, in this specific implementation, the system generates and displays a message 778 in the chat window to inform the user that the screen sharing session has ended. As shown in FIG. 7F, in this specific implementation, message 778 includes a link 779 for the user (or screen share viewer) to submit feedback. For example, the user may have some ideas on how to improve the screen sharing product. Clicking on the link may, for example, open an email or email application for the user to input their ideas for improvement. The email may be preaddressed to an administrator or product manager of the screen sharing product.

Figure 7G:
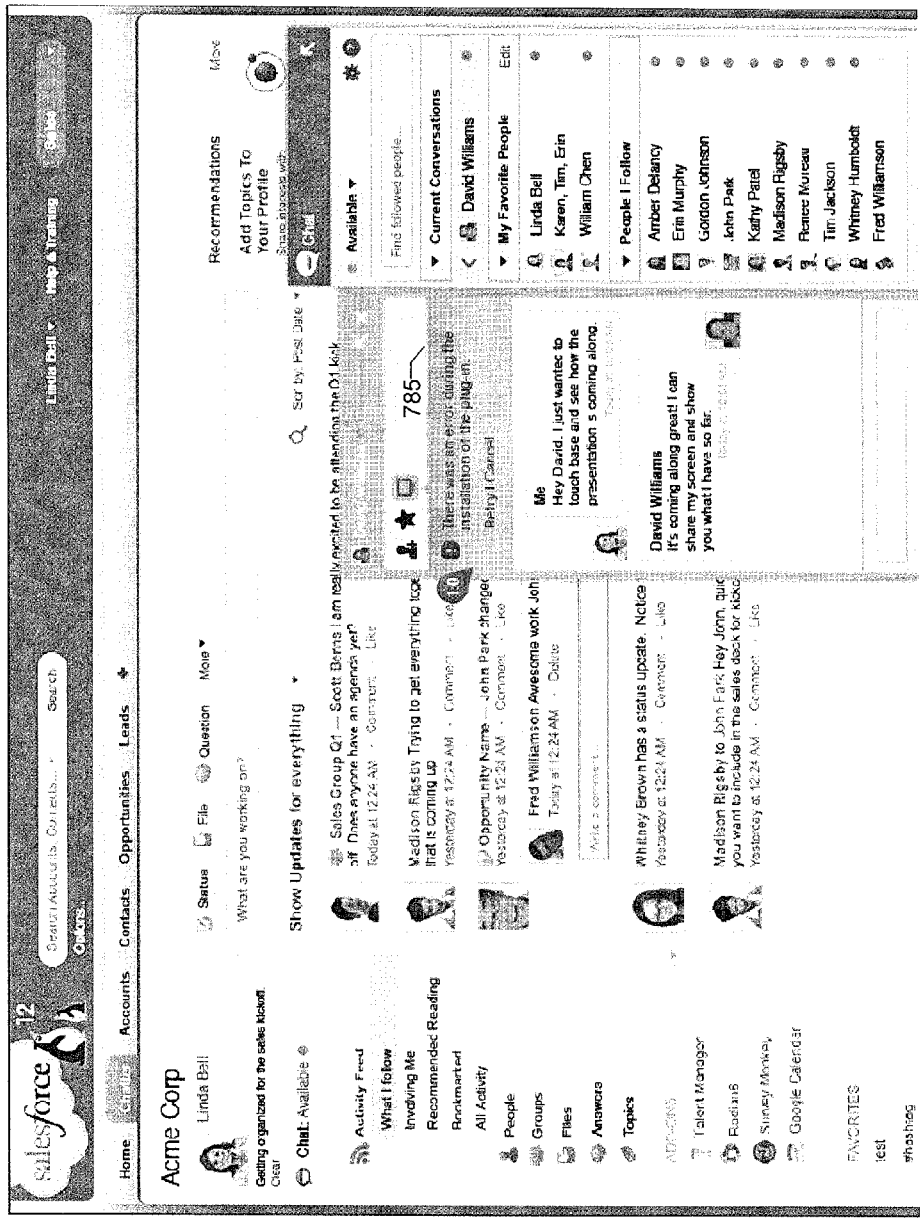
FIG. 7G illustrates a screen shot of a web page showing an error message where installation of the viewer plug-in has failed in the first embodiment.
Figure 7H:
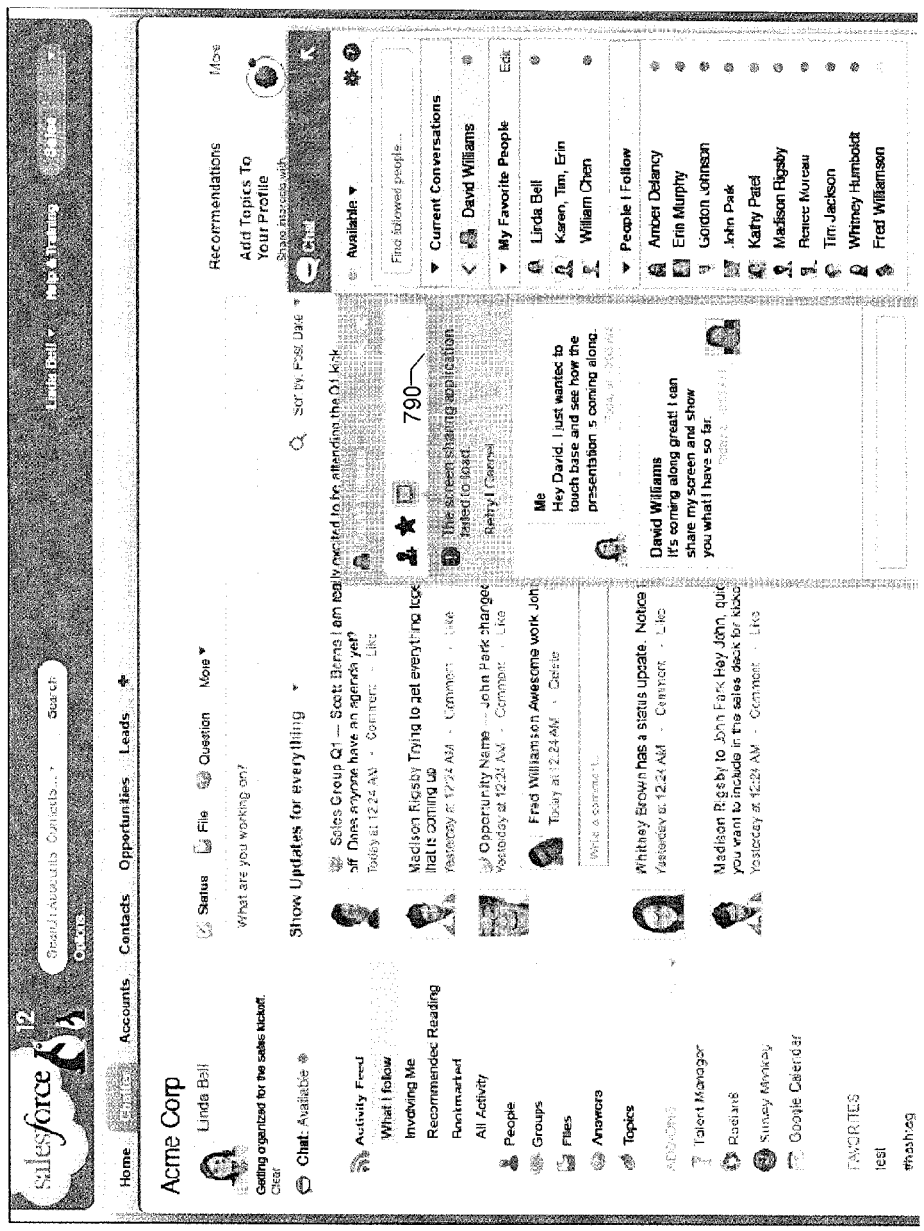
FIG. 7H illustrates a screen shot of a web page showing an error message where the screen sharing application has failed to load in the first embodiment.

FIGS. 7G-7H show some examples of error messages. FIG. 7G shows an example of a message 785 that may be displayed if the plug-in fails to install. The user can either retry the installation process or click cancel. In a specific implementation, by clicking cancel, the user will be shown the "view" button until the presenter has ended the session. FIG. 7H shows an example of a message 790 that may be displayed if the screen sharing application fails to load. The user can either retry the installation process or click cancel. In a specific implementation, by clicking cancel the user will be shown the "view" button until the presenter has ended the session.

It should be appreciated that the system is not limited to the specific GUI, controls, widgets, objects, elements, containers, icons, windows, views, navigation, help text, and layouts shown in the screenshots of FIGS. 2B-7H. Various specific implementations may include GUI elements such as floating windows, modal windows, palette or utility windows, pop-up boxes, dialog boxes, frames, list boxes, context menus, sliders, spinners, menu bars, combo boxes, scroll bars, tabs, tree views, grid views, tooltips, balloon help, infobars, links, buttons, icons, and the like.

FIG. 8 illustrates a block diagram of an environment 810 wherein an on-demand database service implementing an embodiment of a system and method for screen sharing might be used. Environment 810 may include user systems 812, network 814, system 816, processor system 817, application platform 818, network interface 820, tenant data storage 822, system data storage 824, program code 826, and process space 828. In other embodiments, environment 810 may not have all of the components listed and/or may have other elements instead of, or in addition to, those listed above.

Environment 810 is an environment in which an on-demand database service exists. User system 812 may be any machine or system that is used by a user to access a database user system. For example, any of user systems 812 can be a handheld computing device, a mobile phone, a laptop computer, a work station, and/or a network of computing devices. As illustrated in FIG. 8 (and in more detail in FIG. 9) user systems 812 might interact via a network 814 with an on-demand database service, which is system 816.

An on-demand database service, such as system 816, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 816" and "system 816" will be used interchangeably herein. A database image may include one or more database objects. A relational database management system (RDMS) or the equivalent may execute storage and retrieval of information against the database object(s). Application platform 818 may be a framework that allows the applications of system 816 to run, such as the hardware and/or software, e.g., the operating system. In an embodiment, on-demand database service 816 may include an application platform 818 that enables creation, managing and executing one or more applications developed by the provider of the on-demand database service, users accessing the on-demand database service via user systems 812, or third party application developers accessing the on-demand database service via user systems 812.

The users of user systems 812 may differ in their respective capacities, and the capacity of a particular user system 812 might be entirely determined by permissions (permission levels) for the current user. For example, where a salesperson is using a particular user system 812 to interact with system 816, that user system has the capacities allotted to that salesperson. However, while an administrator is using that user system to interact with system 816, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 814 is any network or combination of networks of devices that communicate with one another. For example, network 814 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the one or more implementations might use are not so limited, although TCP/IP is a frequently implemented protocol.

User systems 812 might communicate with system 816 using TCP/IP and, at a higher network level, use other common Internet protocols to communicate, such as HTTP, FTP, AFS, WAP, etc. In an example where HTTP is used, user system 812 might include an HTTP client commonly referred to as a "browser" for sending and receiving HTTP messages to and from an HTTP server at system 816. Such an HTTP server might be implemented as the sole network interface between system 816 and network 814, but other techniques might be used as well or instead. In some implementations, the interface between system 816 and network 814 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 816, shown in FIG. 8, implements a web-based customer relationship management (CRM) system. For example, in one embodiment, system 816 includes application servers configured to implement and execute CRM software applications as well as provide related data, code, forms, webpages and other information to and from user systems 812 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 816 implements applications other than, or in addition to, a CRM application. For example, system 816 may provide tenant access to multiple hosted (standard and custom) applications, including a CRM application. User (or third party developer) applications, which may or may not include CRM, may be supported by the application platform 818, which manages creation, storage of the applications into one or more database objects and executing of the applications in a virtual machine in the process space of the system 816.

One arrangement for elements of system 816 is shown in FIG. 8, including a network interface 820, application platform 818, tenant data storage 822 for tenant data 823, system data storage 824 for system data 825 accessible to system 816 and possibly multiple tenants, program code 826 for implementing various functions of system 816, and a process space 828 for executing MTS system processes and tenant-specific processes, such as running applications as part of an application hosting service. Additional processes that may execute on system 816 include database indexing processes.

Several elements in the system shown in FIG. 8 include conventional, well-known elements that are explained only briefly here. For example, each user system 812 could include a desktop personal computer, workstation, laptop, PDA, cell phone, or any wireless access protocol (WAP) enabled device or any other computing device capable of interfacing directly or indirectly to the Internet or other network connection. User system 812 typically runs an HTTP client, e.g., a browsing program, such as Microsoft's Internet Explorer browser, Google's Chrome browser, Mozilla's Firefox browser, Apple's Safari browser, Netscape's Navigator browser, Opera's browser, or a WAP-enabled browser in the case of a cell phone, smartphone, PDA or other wireless device, or the like, allowing a user (e.g., subscriber of the multi-tenant database system) of user system 812 to access, process and view information, pages and applications available to it from system 816 over network 814. Each user system 812 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 816 or other systems or servers. For example, the user interface device can be used to access data and applications hosted by system 816, and to perform searches on stored data, and otherwise allow a user to interact with various GUI pages that may be presented to a user. As discussed above, embodiments are suitable for use with the Internet, which refers to a specific global inter-network of networks. However, it should be understood that other networks can be used instead of the Internet, such as an intranet, an extranet, a virtual private network (VPN), a non-TCP/IP based network, any LAN or WAN or the like.

According to one embodiment, each user system 812 and all of its components are operator configurable using applications, such as a browser, including computer code run using a central processing unit such as an Intel Pentium® processor or the like. Similarly, system 816 (and additional instances of an MTS, where more than one is present) and all of their components might be operator configurable using application (s) including computer code to run using a central processing unit such as processor system 817, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 816 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Oracle America, Inc.).

According to one embodiment, each system 816 is configured to provide webpages, forms, applications, data and media content to user (client) systems 812 to support the access by user systems 812 as tenants of system 816. As such, system 816 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 9 also illustrates environment 810. However, in FIG. 9 elements of system 816 and various interconnections in an embodiment are further illustrated. FIG. 9 shows that user system 812 may include processor system 812A, memory system 812B, input system 812C, and output system 812D. FIG. 9 shows network 814 and system 816. FIG. 9 also shows that system 816 may include tenant data storage 822, tenant data 823, system data storage 824, system data 825, User Interface (UI) 930, Application Program Interface (API) 932, PL/SOQL 934, save routines 936, application setup mechanism 938, applications servers $900_1$-$900_N$, system process space 902, tenant process spaces 904, tenant management process space 910, tenant storage area 912, user storage 914, and application metadata 916. In other embodiments, environment 810 may not have the same elements as those listed above and/or may have other elements instead of, or in addition to, those listed above.

User system 812, network 814, system 816, tenant data storage 822, and system data storage 824 were discussed above in FIG. 8. Regarding user system 812, processor system 812A may be any combination of one or more processors. Memory system 812B may be any combination of one or more memory devices, short term, and/or long term memory. Input system 812C may be any combination of input devices, such as one or more keyboards, mice, trackballs, scanners, cameras, and/or interfaces to networks. Output system 812D may be any combination of output devices, such as one or more monitors, printers, and/or interfaces to networks. As shown by FIG. 9, system 816 may include a network interface 820 (of FIG. 8) implemented as a set of HTTP application servers 900, an application platform 818, tenant data storage 822, and system data storage 824. Also shown is system process space 902, including individual tenant process spaces 904 and a tenant management process space 910. Each application server 900 may be configured to tenant data storage 822 and the tenant data 823 therein, and system data storage 824 and the system data 825 therein to serve requests of user systems 812. The tenant data 823 might be divided into individual tenant storage areas 912, which can be either a physical arrangement and/or a logical arrangement of data. Within each tenant storage area 912, user storage 914 and application metadata 916 might be similarly allocated for each user. For example, a copy of a user's most recently used (MRU) items might be stored to user storage 914. Similarly, a copy of MRU items for an entire organization that is a tenant might be stored to tenant storage area 912. A UI 930 provides a user interface and an API 932 provides an application programmer interface to system 816 resident processes to users and/or developers at user systems 812. The tenant data and the system data may be stored in various databases, such as one or more Oracle™ databases.

Application platform 818 includes an application setup mechanism 938 that supports application developers' creation and management of applications, which may be saved as metadata into tenant data storage 822 by save routines 936 for execution by subscribers as one or more tenant process spaces 904 managed by tenant management process 910 for example. Invocations to such applications may be coded using PL/SOQL 34 that provides a programming language style interface extension to API 932. A detailed description of some PL/SOQL language embodiments is discussed in commonly owned U.S. Pat. No. 7,730,478 entitled, METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is incorporated in its entirety herein for all purposes. Invocations to applications may be detected by one or more system processes, which manages retrieving application metadata 916 for the subscriber making the invocation and executing the metadata as an application in a virtual machine.

Each application server 900 may be communicably coupled to database systems, e.g., having access to system data 825 and tenant data 823, via a different network connection. For example, one application server $900i$ might be coupled via the network 814 (e.g., the Internet), another application server $900_{N-1}$ might be coupled via a direct network link, and another application server $900_N$ might be coupled by yet a different network connection. Transfer Control Protocol and Internet Protocol (TCP/IP) are typical protocols for communicating between application servers 900 and the database system. However, it will be apparent to one skilled in the art that other transport protocols may be used to optimize the system depending on the network interconnect used.

In certain embodiments, each application server 900 is configured to handle requests for any user associated with any organization that is a tenant. Because it is desirable to be able to add and remove application servers from the server pool at any time for any reason, there is preferably no server affinity for a user and/or organization to a specific application server 900. In one embodiment, therefore, an interface system implementing a load balancing function (e.g., an F5 Big-IP load balancer) is communicably coupled between the application servers 900 and the user systems 812 to distribute requests to the application servers 900. In one embodiment, the load balancer uses a least connections algorithm to route user requests to the application servers 900. Other examples of load balancing algorithms, such as round robin and observed response time, also can be used. For example, in certain embodiments, three consecutive requests from the same user could hit three different application servers 900, and three requests from different users could hit the same application server 900. In this manner, system 816 is multi-tenant, wherein system 816 handles storage of, and access to, different objects, data and applications across disparate users and organizations.

As an example of storage, one tenant might be a company that employs a sales force where each salesperson uses system 816 to manage their sales process. Thus, a user might maintain contact data, leads data, customer follow-up data, performance data, goals and progress data, etc., all applicable to that user's personal sales process (e.g., in tenant data storage 822). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 816 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 816 might also maintain system level data usable by multiple tenants or other data. Such system level data might include industry reports, news, postings, and the like that are sharable among tenants.

In certain embodiments, user systems 812 (which may be client systems) communicate with application servers 900 to request and update system-level and tenant-level data from system 816 that may require sending one or more queries to tenant data storage 822 and/or system data storage 824. System 816 (e.g., an application server 900 in system 816) automatically generates one or more SQL statements (e.g., one or more SQL queries) that are designed to access the desired information. System data storage 824 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "Custom Entities and Fields in a Multi-Tenant Database System", which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method comprising:
    managing, by a computer server system, a browser-based chat session between first and second users, the first user being at a first display, and the second user being at a second display;
    providing, in response to the first user selecting a screen sharing button presented within a first chat window for the chat session displayed on the first display during the chat session between the first user and the second user, a first message generated by the computer server system inviting the second user to view information being displayed on the first display;
    displaying the first message inviting the second user to view the information in a second chat window for the chat session on the second display;
    displaying a second message inputted by the first user in the second chat window, wherein the second message is visually distinguishable from the first message;
    receiving an acceptance from the second user to view the information; and
    upon receiving the acceptance, sharing the information being displayed on the first display with the second user on a first shared information window separate from the second chat window on the second display.

2. The method of claim 1 wherein the chat session comprises a third user, the third user being at a third display, and the method comprises:
    providing, in response to the first user selecting the screen sharing button presented within the first chat window for the chat session displayed on the first display during the chat session between the first user, the second user and the third user, a message inviting the third user to view the information being displayed on the first display;
    displaying the message inviting the third user to view the information in a third chat window for the chat session on the third display;
    receiving an acceptance from the third user to view the information; and
    upon receiving the acceptance, sharing the information being displayed on the first display with the third user on a second shared information window separate from the third chat window on the third display.

3. The method of claim 1 wherein the first user is at a third display, next to the first display, and the method comprises:
    prompting the first user to select one of the information being displayed on the first display to share or information being displayed on the third display to share; and
    receiving a selection of the information being displayed on the first display to share.

4. The method of claim 1 wherein the message inviting the second user to view information being displayed on the first display is a first message, and the method comprises:
    providing a second message indicating that information being displayed on the first display is being shared; and
    displaying the second message in the first chat window for the chat session on the first display.

5. A tangible non-transitory machine-readable medium carrying one or more sequences of instructions, which instructions, when executed by one or more processors, cause the one or more processors to carry out the steps of:
    managing, by a computer server system, a browser-based chat session between first and second users, the first user being at a first display, and the second user being at a second display;
    providing, in response to the first user selecting a screen sharing button presented within a first chat window for the chat session displayed on the first display during the chat session between the first user and the second user, a first message generated by the computer server system inviting the second user to view information being displayed on the first display;

displaying the first message inviting the second user to view the information in a second chat window for the chat session on the second display;

displaying a second message inputted by the first user in the second chat window, wherein the second message is visually distinguishable from the first message;

receiving an acceptance from the second user to view the information; and upon receiving the acceptance, sharing the information being displayed on the first display with the second user on a first shared information window separate from the second chat window on the second display.

6. The tangible non-transitory machine-readable medium of claim 5 wherein the chat session comprises a third user, the third user being at a third display, and the one or more sequences of instructions, which instructions, when executed by one or more processors, cause the one or more processors to carry out the steps of:

providing, in response to the first user selecting the screen sharing button presented within the first chat window for the chat session displayed on the first display during the chat session between the first user, the second user and the third user, a message inviting the third user to view the information being displayed on the first display;

displaying the message inviting the third user to view the information in a third chat window for the chat session on the third display;

receiving an acceptance from the third user to view the information; and upon receiving the acceptance, sharing the information being displayed on the first display with the third user on a second shared information window separate from the third chat window on the third display.

7. The tangible non-transitory machine-readable medium of claim 5 wherein the first user is at a third display, next to the first display, and the one or more sequences of instructions, which instructions, when executed by one or more processors, cause the one or more processors to carry out the steps of:

prompting the first user to select one of the information being displayed on the first display to share or information being displayed on the third display to share; and receiving a selection of the information being displayed on the first display to share.

8. The tangible non-transitory machine-readable medium of claim 5 wherein the message inviting the second user to view information being displayed on the first display is a first message, and the one or more sequences of instructions, which instructions, when executed by one or more processors, further cause the one or more processors to carry out the steps of:

providing a second message indicating that information being displayed on the first display is being shared; and displaying the second message in the first chat window for the chat session on the first display.

9. An apparatus comprising:

a processor; and one or more stored sequences of instructions which, when executed by the processor, cause the processor to carry out the steps of:

managing, by a computer server system, a browser-based chat session between first and second users, the first user being at a first display, and the second user being at a second display;

providing, in response to the first user selecting a screen sharing button presented within a first chat window for the chat session displayed on the first display during the chat session between the first user and the second user, a first message generated by the computer server system inviting the second user to view information being displayed on the first display;

displaying the first message inviting the second user to view the information in a second chat window for the chat session on the second display;

displaying a second message inputted by the first user in the second chat window, wherein the second message is visually distinguishable from the first message;

receiving an acceptance from the second user to view the information; and upon receiving the acceptance, sharing the information being displayed on the first display with the second user on a first shared information window separate from the second chat window on the second display.

10. The apparatus of claim 9 wherein the chat session comprises a third user, the third user being at a third display, and the one or more stored sequences of instructions which, when executed by the processor, cause the processor to carry out the steps of:

providing, in response to the first user selecting the screen sharing button presented within the first chat window for the chat session displayed on the first display during the chat session between the first user, the second user and the third user, a message inviting the third user to view the information being displayed on the first display;

displaying the message inviting the third user to view the information in a third chat window for the chat session on the third display;

receiving an acceptance from the third user to view the information; and upon receiving the acceptance, sharing the information being displayed on the first display with the third user on a second shared information window separate from the third chat window on the third display.

11. The apparatus of claim 9 wherein the first user is at a third display, next to the first display, and the one or more stored sequences of instructions which, when executed by the processor, cause the processor to carry out the steps of:

prompting the first user to select one of the information being displayed on the first display to share or information being displayed on the third display to share; and receiving a selection of the information being displayed on the first display to share.

12. A method for transmitting code comprising:

transmitting code, by a computer server system, to manage a browser-based chat session between first and second users, the first user being at a first display, and the second user being at a second display;

transmitting code to provide, in response to the first user selecting a screen sharing button presented within a first chat window for the chat session displayed on the first display during the chat session between the first user and the second user, a first message generated by the computer server system inviting the second user to view information being displayed on the first display;

transmitting code to display the first message inviting the second user to view the information in a second chat window for the chat session on the second display;

transmitting code to display a second message inputted by the first user in the second chat window, wherein the second message is visually distinguishable from the first message;

transmitting code to receive an acceptance from the second user to view the information; and upon receiving the acceptance, transmitting code to, share the information being displayed on the first display with the second user on a first shared information window separate from the second chat window on the second display.

13. The method of claim 12 wherein the chat session comprises a third user, the third user being at a third display, and the method comprises:

transmitting code to provide, in response to the first user selecting the screen sharing button presented within the first chat window for the chat session displayed on the first display during the chat session between the first user, the second user and the third user, a message inviting the third user to view the information being displayed on the first display;

transmitting code to display the message inviting the third user to view the information in a third chat window for the chat session on the third display;

transmitting code to receive an acceptance from the third user to view the information; and transmitting code to upon receiving the acceptance, share the information being displayed on the first display with the third user on a second shared information window separate from the third chat window on the third display.

14. The method of claim 12 wherein the first user is at a third display, next to the first display, and the method comprises:

transmitting code to prompt the first user to select one of the information being displayed on the first display to share or information being displayed on the third display to share; and transmitting code to receive a selection of the information being displayed on the first display to share.

* * * * *